United States Patent [19]

Shankland

[11] 4,398,147
[45] Aug. 9, 1983

[54] METHODS OF TESTING MULTIFREQUENCY DIALING SIGNALS

[75] Inventor: Timothy A. Shankland, Indianapolis, Ind.

[73] Assignee: Western Electric Company, Inc., New York, N.Y.

[21] Appl. No.: 254,563

[22] Filed: Apr. 15, 1981

[51] Int. Cl.³ .............................................. H04M 1/50
[52] U.S. Cl. ............................ 324/78 R; 179/84 VF; 179/175.2 A; 179/175.2 C
[58] Field of Search .................... 179/84 VF, 175.2 C, 179/175.2 A; 364/484; 340/653, 658; 370/110.2; 371/20, 25; 324/78 R, 78 Z

[56] References Cited

U.S. PATENT DOCUMENTS

| | | | |
|---|---|---|---|
| 3,959,603 | 5/1976 | Nilssen et al. | 179/84 VF |
| 4,028,501 | 6/1977 | Rittenhouse | 179/84 VF |
| 4,082,924 | 4/1978 | Carlqvist et al. | 179/84 VF |
| 4,091,243 | 5/1978 | Mizrahi et al. | 179/84 VF |

Primary Examiner—G. Z. Rubinson
Assistant Examiner—James L. Dwyer
Attorney, Agent, or Firm—J. J. Jordan

[57] ABSTRACT

A predetermined sequence of multifrequency signals are fed to a multifrequency dialing board (24) and are separated into their component signals by high and low filter circuits (50 and 52). The component signals are converted into (1) square wave signals by zero crossing detectors (54 and 56) and (2) d.c. signals having amplitudes proportional to their respective frequencies by converters (72 and 74). The d.c. signals are then converted by analog-to-digital converters (80 and 82) into digital signals having values equivalent to the amplitude of the d.c. signals. A microprocessor circuit (60) monitors the digital signals to determine the amplitude of the signals. The microprocessor circuit (60) determines the frequency of the component signals by monitoring the time required for eight cycles of the respective square wave signals. The microprocessor circuit (60) also facilitates the self-calibration of the multifrequency dialing board (24) which ensures the correct operation thereof in the event of an error due to temperature or aging components.

2 Claims, 24 Drawing Figures

FREQUENCY-CHARACTER MATRIX

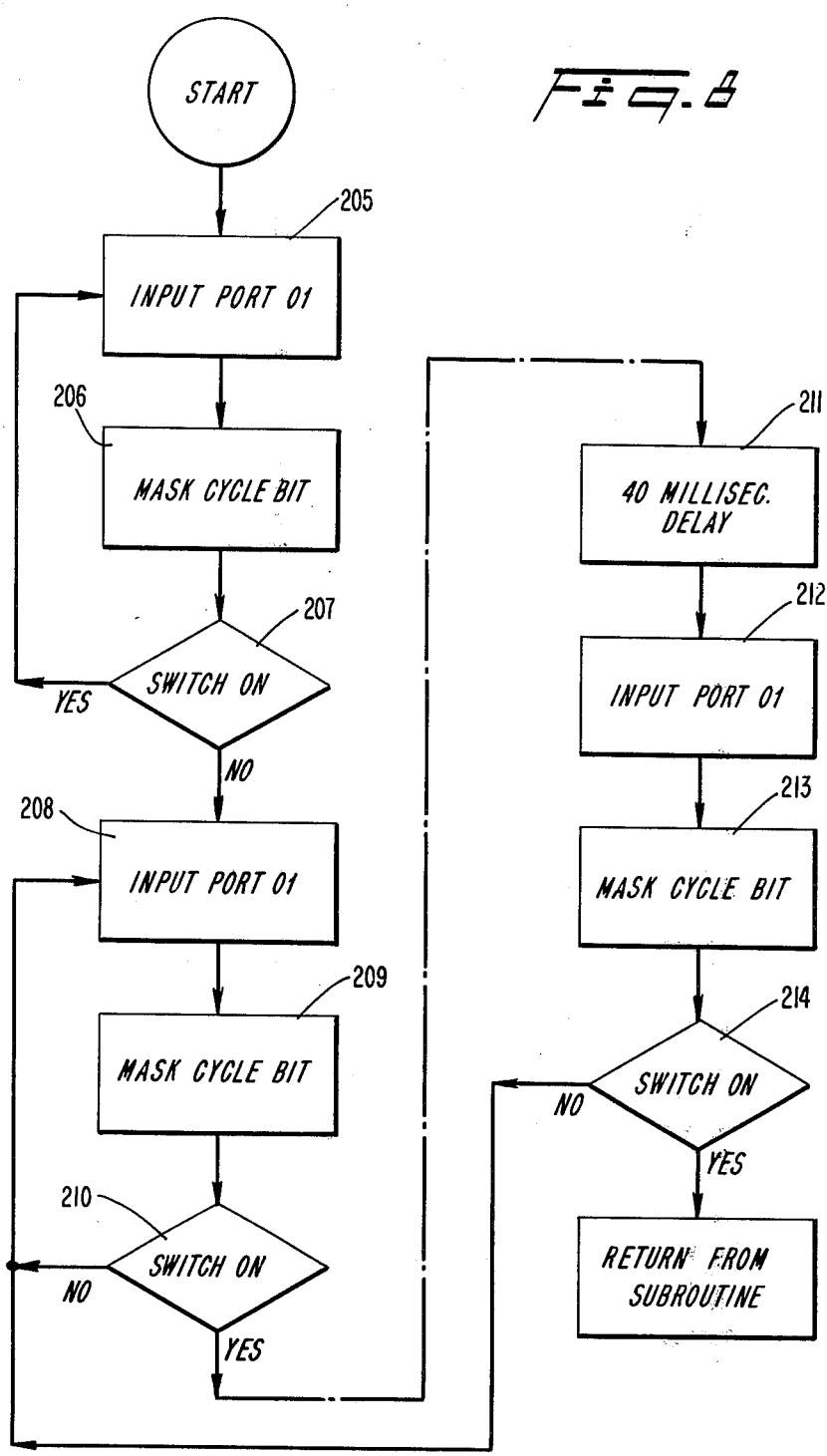

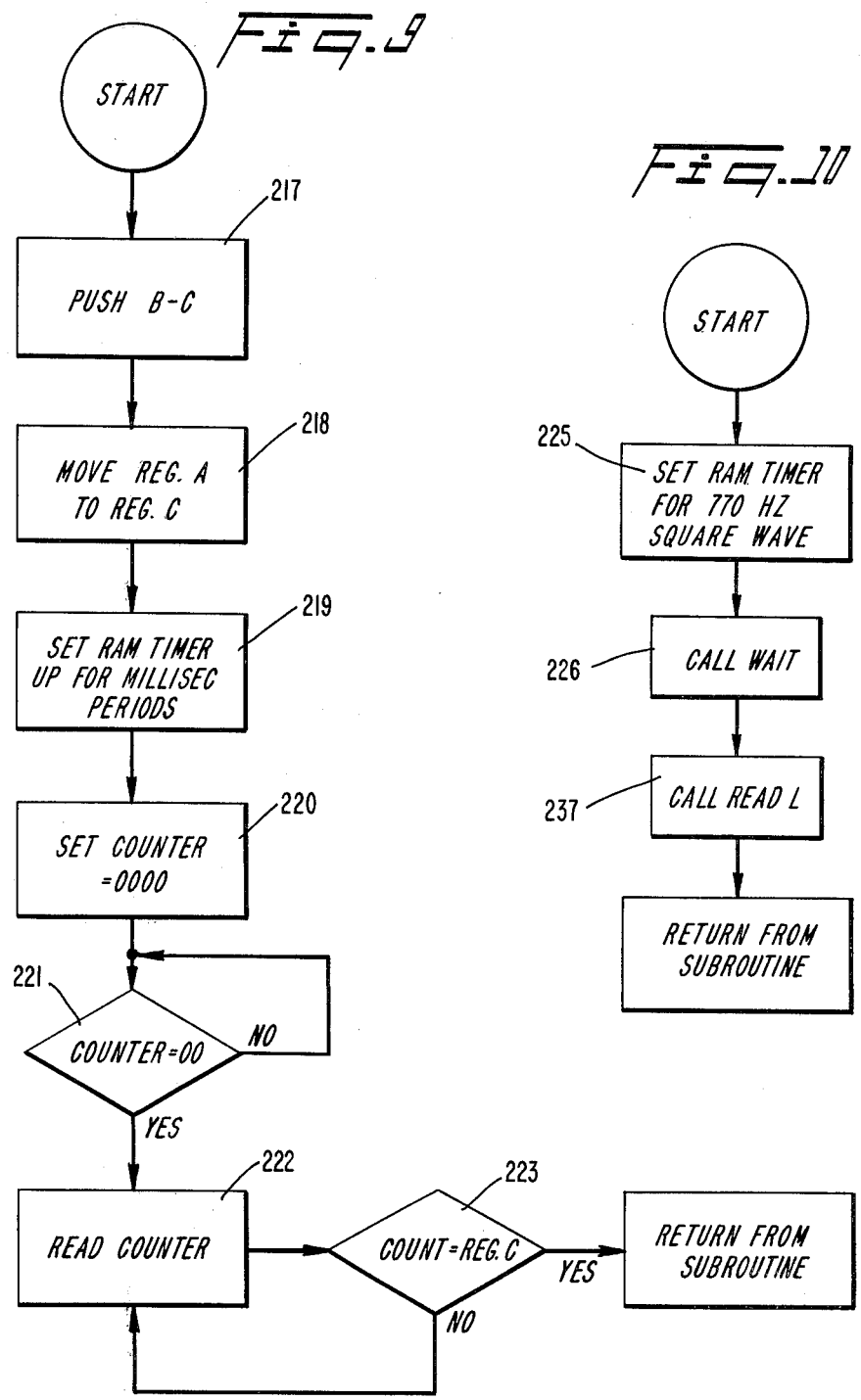

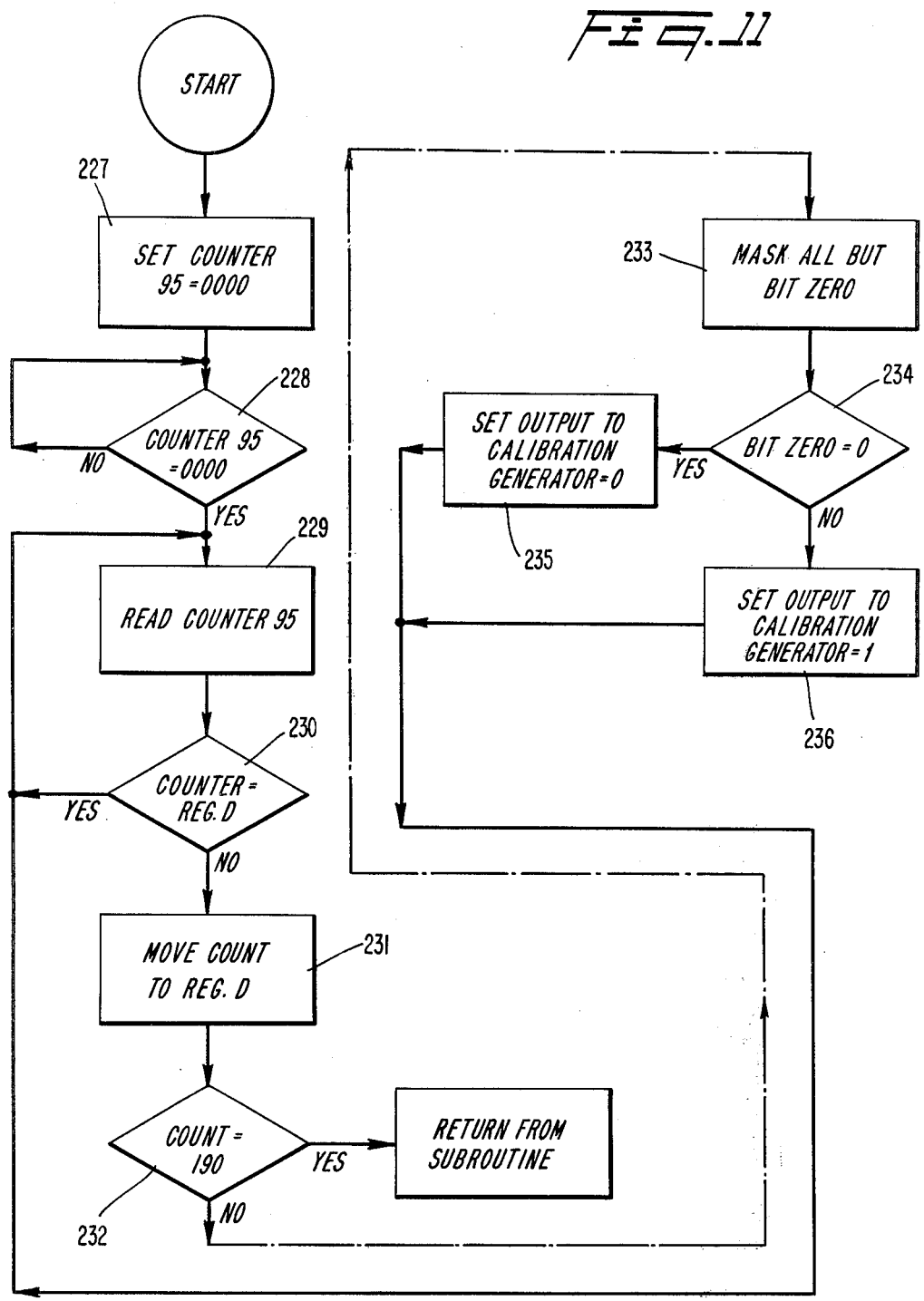

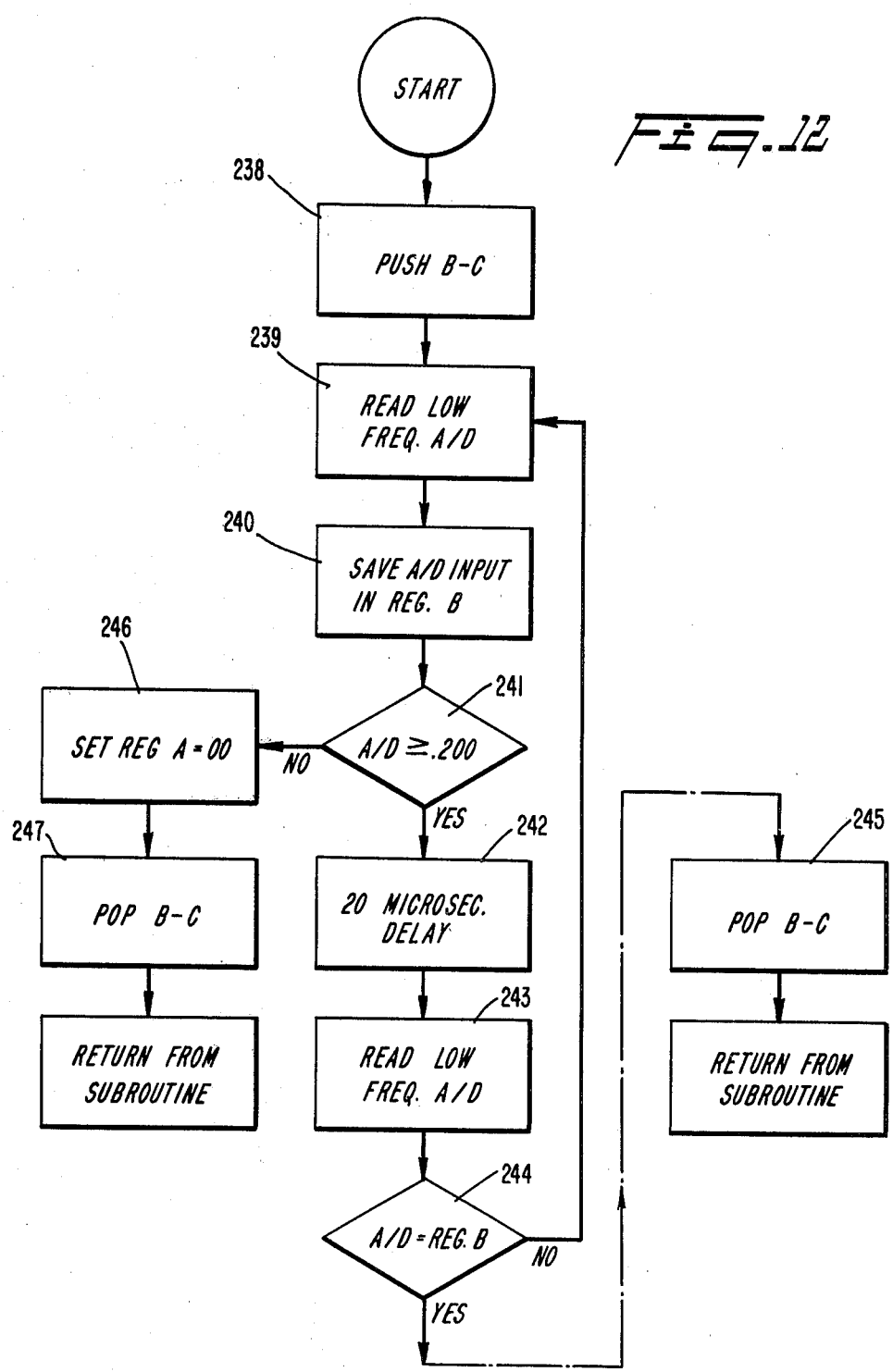

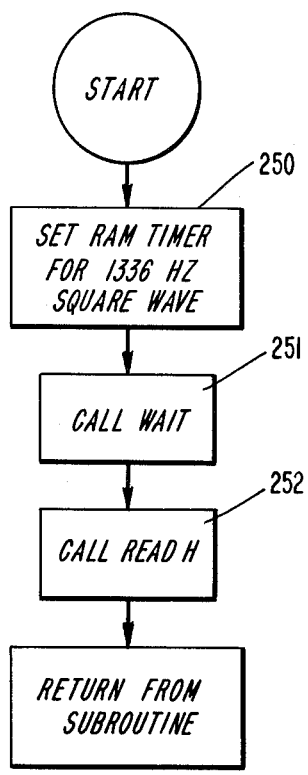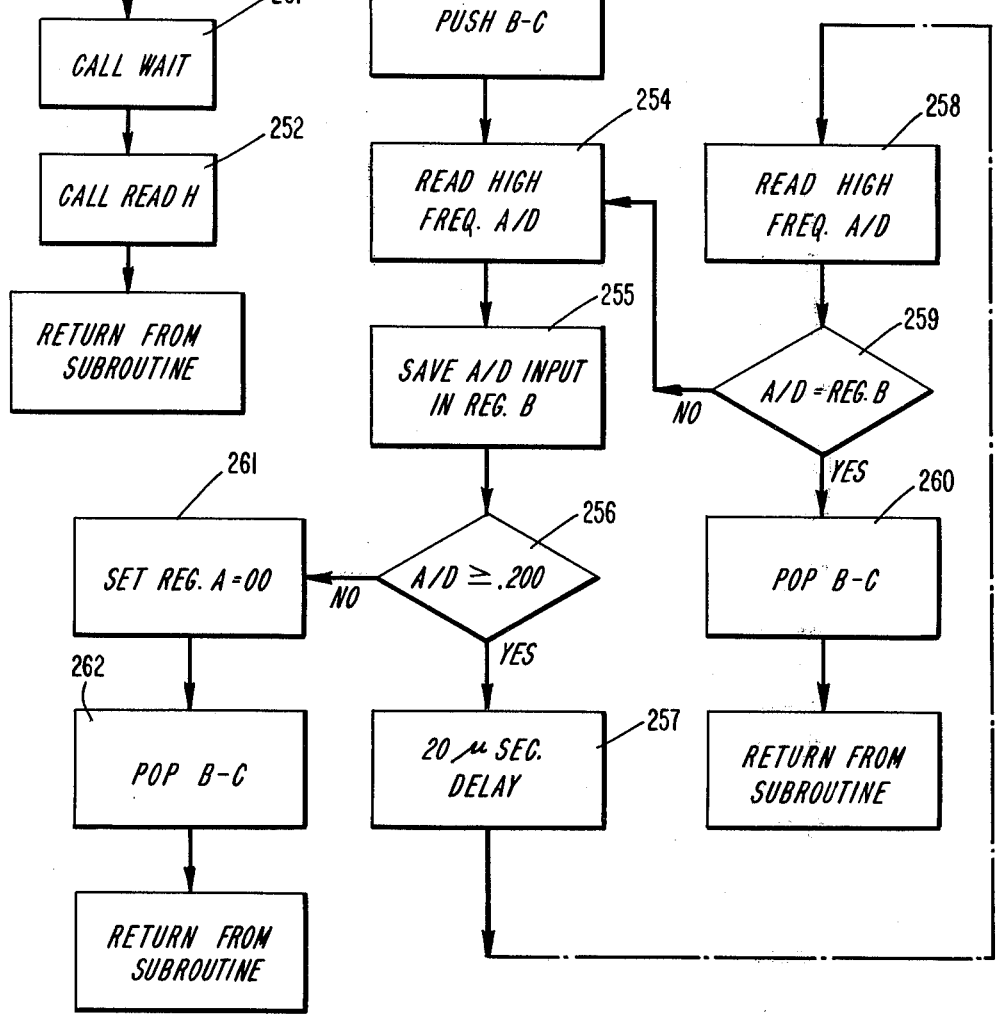

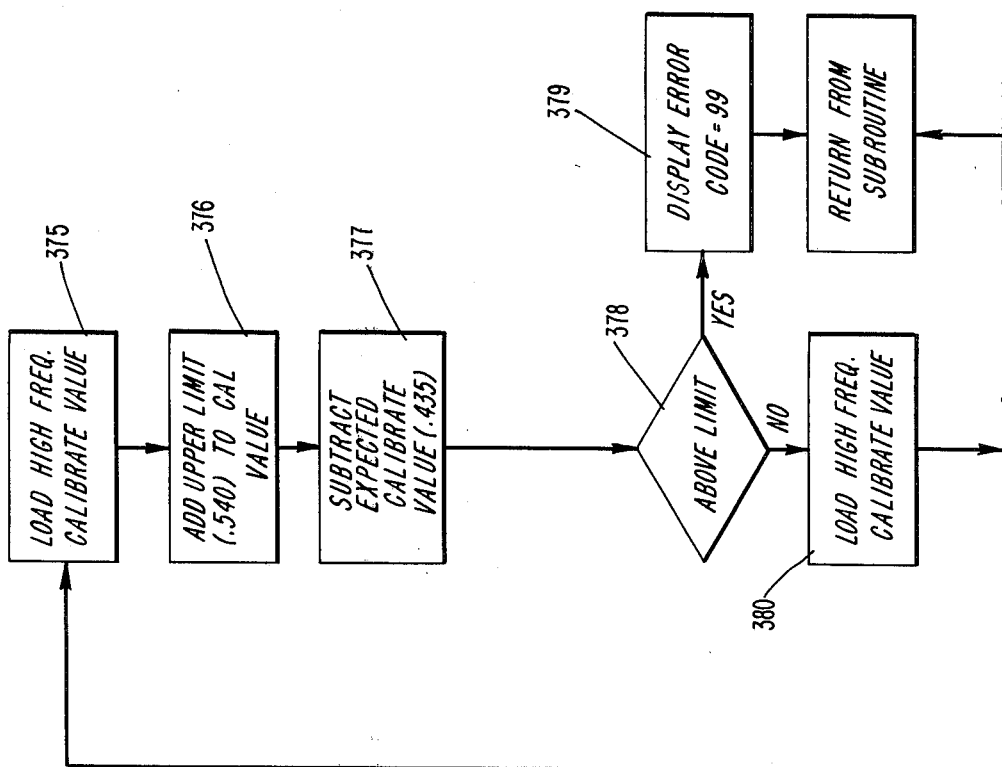
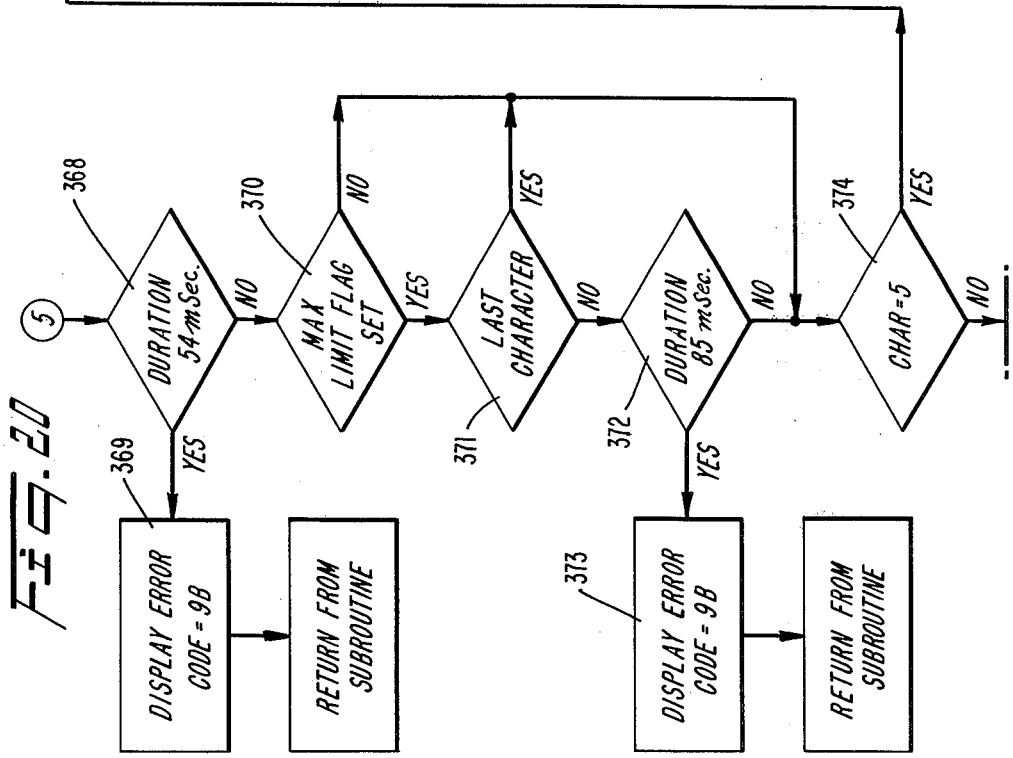
Fig. 20

METHODS OF TESTING MULTIFREQUENCY DIALING SIGNALS

TECHNICAL FIELD

This invention relates to methods of testing multifrequency dialing signals and particularly to methods of testing the amplitude and frequency of multifrequency dialing signals.

BACKGROUND OF THE INVENTION

Multifrequency signaling is now commonplace in communications systems. One type of multifrequency signaling employs signals generated in accordance with a multifrequency code. The coded signal includes selected combinations of coincident two-tone burst, and each combination includes one tone from a relatively high-frequency band and one tone from a relatively low-frequency band.

Multifrequency signaling is employed in subscriber signaling, signaling between central offices, interoffice communication, remote control of other systems and entering data into computer systems. It is increasingly important that the generation of valid multifrequency signals be achieved accurately.

One prior method of testing the validity of multifrequency dialing signals involves splitting the multifrequency signal into high and low frequency groups using bandpass filters. Each of the frequency groups are amplified and clipped to form a square wave signal having the same period and the respective frequency group. Each of the square wave signals are then fed through divide-by-five counters. The outputs of these counters are used to gate two additional counters which are clocked by a reference clock. The additional counters are enabled by threshold detectors which determine if the amplitudes of respective frequency group signals exceed predetermined threshold values. Thus, when the threshold values are exceeded, the additional counters are enabled and count during intervals of five counts of each counter. The outputs of these counters are then hardwired through a series of logic gates to determine the characters being received.

In this technique, all of the frequency limits are predetermined and hardwired which are not subject to be easily changed. All amplitude limits must be manually set for the upper and lower limits which require switching circuitry for each amplitude limit. Moreover, there is no provision for self-calibration and the system required to implement the technique is very large and expensive.

U.S. Pat. No. 4,028,501, which issued to D. E. Rittenhouse, discloses a method and an apparatus for translating multifrequency signaling. Multifrequency signals are received and filtered into high and low bands. The signals in the high and low bands are used to derive high band and low band threshold levels, respectively. The signals in each band having amplitudes exceeding the threshold level in the band are limited and the signals of lesser amplitudes are inhibited. In each band, the frequency of the limited signals is digitally detected. An output signal, indicative of the frequencies detected, is generated solely in response to a substantially simultaneous and constant frequency detection in both bands extending over a preselected period of time. Signaling information is thereby translated from tone signals coexisting in any one of a plurality of predetermined frequency combinations for at least the preselected period of time and having substantially similar amplitudes.

In view of the foregoing, there is a need for a technique which accurately and economically tests the validity of multifrequency signals and which allows for self-calibration.

SUMMARY OF THE INVENTION

This invention contemplates a method of testing the frequency of a signal. A standard signal having a known amplitude is processed through a signal preparation circuit to determine any gain or loss in amplitude as the signal is processed through the signal preparation circuit. An unprocessed signal is then processed through the signal preparation circuit wherein the frequency of the unprocessed signal is to be tested. The amplitude of the processed signal is adjusted by an amount equal to the determined gain or loss of the amplitude of the standard signal. A determination is made as to whether the adjusted amplitude exceeds a threshold value. A time interval required by a preset number of cycles of the unprocessed signal is measured, in response to the determination that the adjusted amplitude exceeded the threshold value, to provide an indication of the frequency of the unprocessed signal. The time interval is compared with a preset time interval to provide an indication as to whether the frequency of the unprocessed signal is an acceptable frequency.

BRIEF DESCRIPTION OF THE DRAWINGS

FIGS. 6 through 23 show various flow diagrams which illustrate the programmed procedure of control and operation of the system of FIG. 3 in accordance with certain principles of the invention.

DETAILED DESCRIPTION

Figure 1:
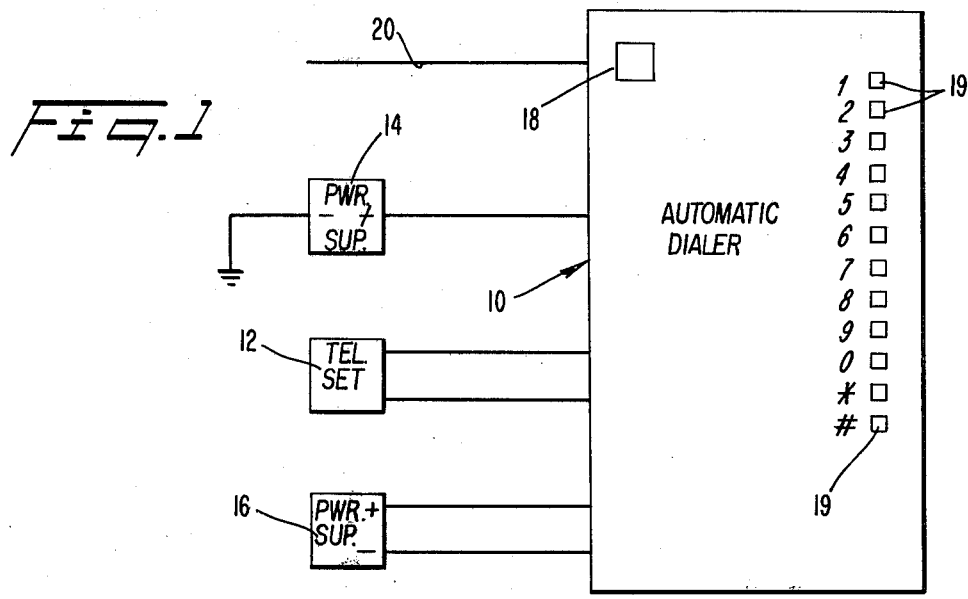
FIG. 1 is a plan view of an automatic dialer.

Referring to FIG. 1 there is illustrated an automatic dialer, designated generally by the numeral 10, sold under the trademark Touch-a-matic owned by American Telephone and Telegraph Company. The dialer 10 is capable of storing twelve sixteen-digit telephone numbers. An impedance device 12, such as a telephone set, and power supplies 14 and 16 are coupled to the dialer 10. The impedance device 12 and power supplies 14 and 16 are required to ensure proper operation of the dialer 10. The dialer 10 includes a record button 18 and twelve location buttons 19. Record button 18 is used to place the device 10 in a mode for recording and storing within a microprocessor (not shown) telephone numbers selected from characters such as "0" through "9" and symbols # and *. The location buttons 19 have two functions: (1) when initially depressed, they indicate to the microprocessor, within the dialer 10, the storage location of a sixteen-digit telephone number and (2) each button represents a character such as numbers "0" through "9" or symbols # and #. In addition, the dialer 10 includes a hybrid integrated circuit (not shown)

which generates a multifrequency signal for each of the characters stored within the device.

In use, an operator activates a record mode of the dialer 10 by depressing the record button 18. Thereafter a selected one of the location buttons 19 is depressed to select the storage location within the microprocessor at which the telephone number is to be stored. The operator then enters the telephone number by depressing the appropriate location buttons 19 which represent the number to be stored. Symbols * and # also may be stored by depressing the appropriate location buttons 19. Up to sixteen characters can be stored representing the telephone number. This procedure is repeated to store telephone numbers in the storage locations associated with remaining location buttons 19. Once the telephone numbers have been stored, the record button 18 is depressed to place the dialer 10 in a transmit mode. Thereafter, whenever one of the location buttons 19 is depressed, the dialer 10 generates over line 20 a sequence of multifrequency signals representing the sequence of characters of the telephone number stored at that location.

Figure 2:
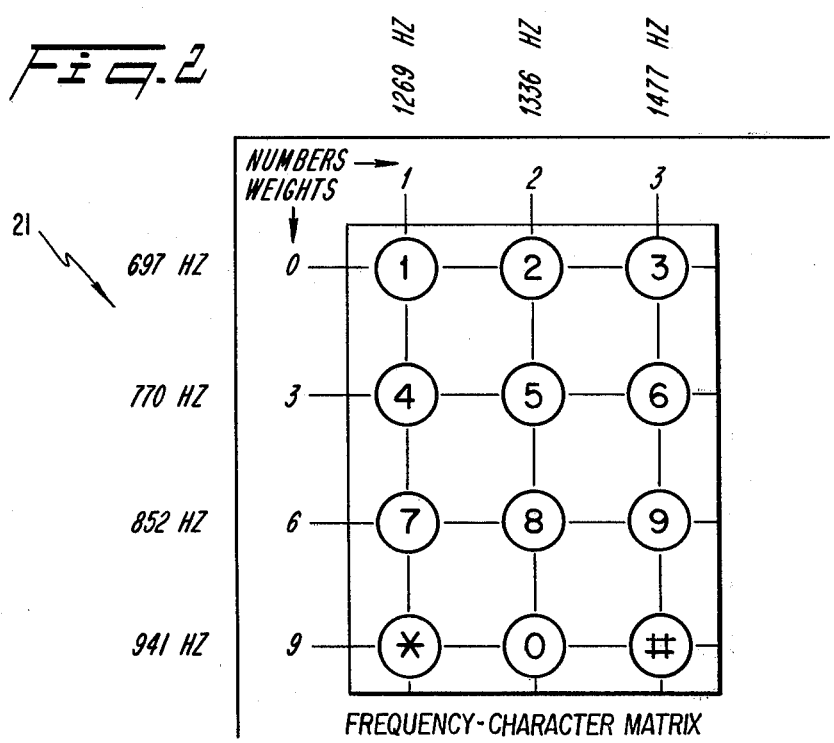
FIG. 2 is a matrix which illustrates twelve discrete characters and their respective high and low component frequencies.

Referring to FIG. 2, there is illustrated a matrix, designated generally by the numeral 21, which shows various combinations of frequencies and their character equivalence. As is well known in the communications industry, the multifrequency signal is an electrical analog signal which is composed of the combination of two component signals in the form of sine waves of different frequencies, one of which is selected from a low frequency group and the other from a high frequency group. The low group includes the frequencies 697 hertz (Hz), 770 Hz, 852 Hz and 941 Hz. The high group includes frequencies 1209 Hz, 1336 Hz and 1477 Hz. When used in the communications industry, a signal of one frequency of the high group is combined with a signal of one frequency of the low group to produce a multifrequency signal. As is shown in FIG. 2, a multifrequency signal is associated with one of twelve discrete characters. The twelve characters are typically used to identify the numbers 0 through 9 and the symbols * and #.

Figure 3:
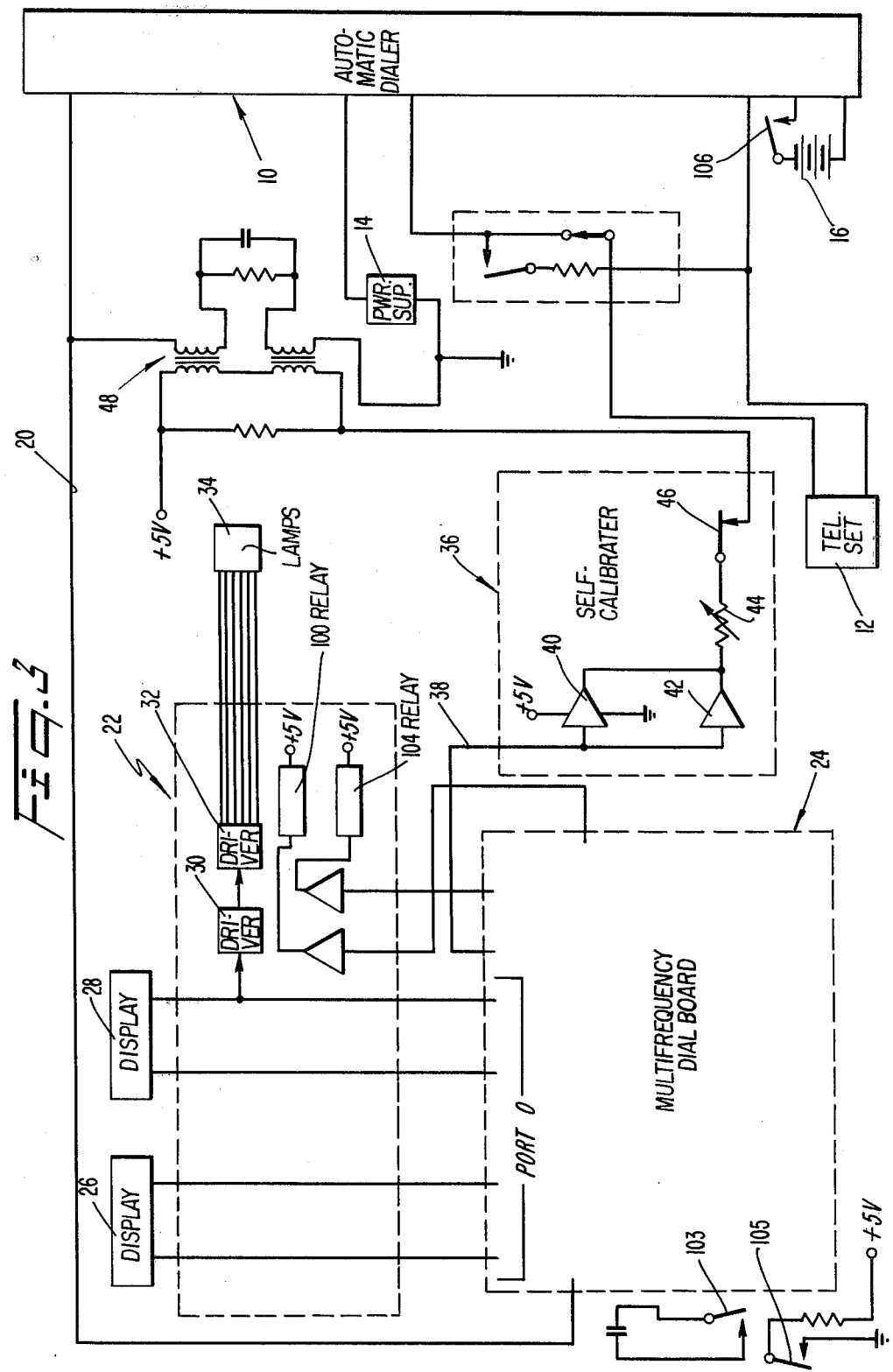
FIG. 3 is a schematic illustration of a system for testing the frequency of multifrequency analog signals in accordance with certain principles of the invention.

Referring to FIG. 3, there is illustrated a system, designated generally by the numeral 22, for testing the multifrequency signals generated by the automatic dialer 10. The dialer 10 automatically generates and feeds multifrequency signals representing a predetermined sequence of characters over line 20 to a multifrequency dial board, designated generally by the numeral 24. The multifrequency dial board 24 is controlled by a stored program to test and process the frequency and amplitude of each of the multifrequency signals in the predetermined sequence which appears on line 20. After the predetermined sequence of characters has been stored, for example, in the location associated with the character one (1), the location button 19 associated therewith is depressed. The dialer 10 then generates the sequence of multifrequency signals representing each of the characters in the predetermined sequence. The system 22 tests the first multifrequency signal in the predetermined sequence and displays on visual display devices 26 and 28 the character associated with the multifrequency signal if the signal is valid. Thereafter, the system 22 tests each of the multifrequency signals associated with the remaining characters in the predetermined sequence and displays the appropriate characters if the multifrequency signals are valid. However, if any of the multifrequency signals associated with the sixteen characters are not valid, an error message is displayed on devices 26 and 28 and the system 22 is halted. Circuits 30 and 32 are also coupled to the dial board 24 and drive step lamps 34. Step lamps 34 gives a visual indication of the status of the program, which is stored in the dial board 24, as the multifrequency signals are tested by the system 22.

The system 22 also includes a self-calibration circuit, designated generally by the numeral 26. A standard signal having a known frequency and amplitude is generated by the multifrequency dial board 24 and is fed over line 38 to a pair of parallel buffers 40 and 42. An output signal from the buffers 40 and 42 is fed through a potentiometer 44 and relay contact 46 to a transformer 48. The transformer 48 is used as an impedance device to simulate a central office in the system 22. The secondary of the transformer 48 is coupled to line 20 which feeds the standard signal having a known frequency and amplitude to the multifrequency dial board 24. The dial board 24 processes the standard signal and generated an appropriate calibration factor which is used to adjust subsequent tests performed on unprocessed signals generated by the dialer 10.

Figure 4:
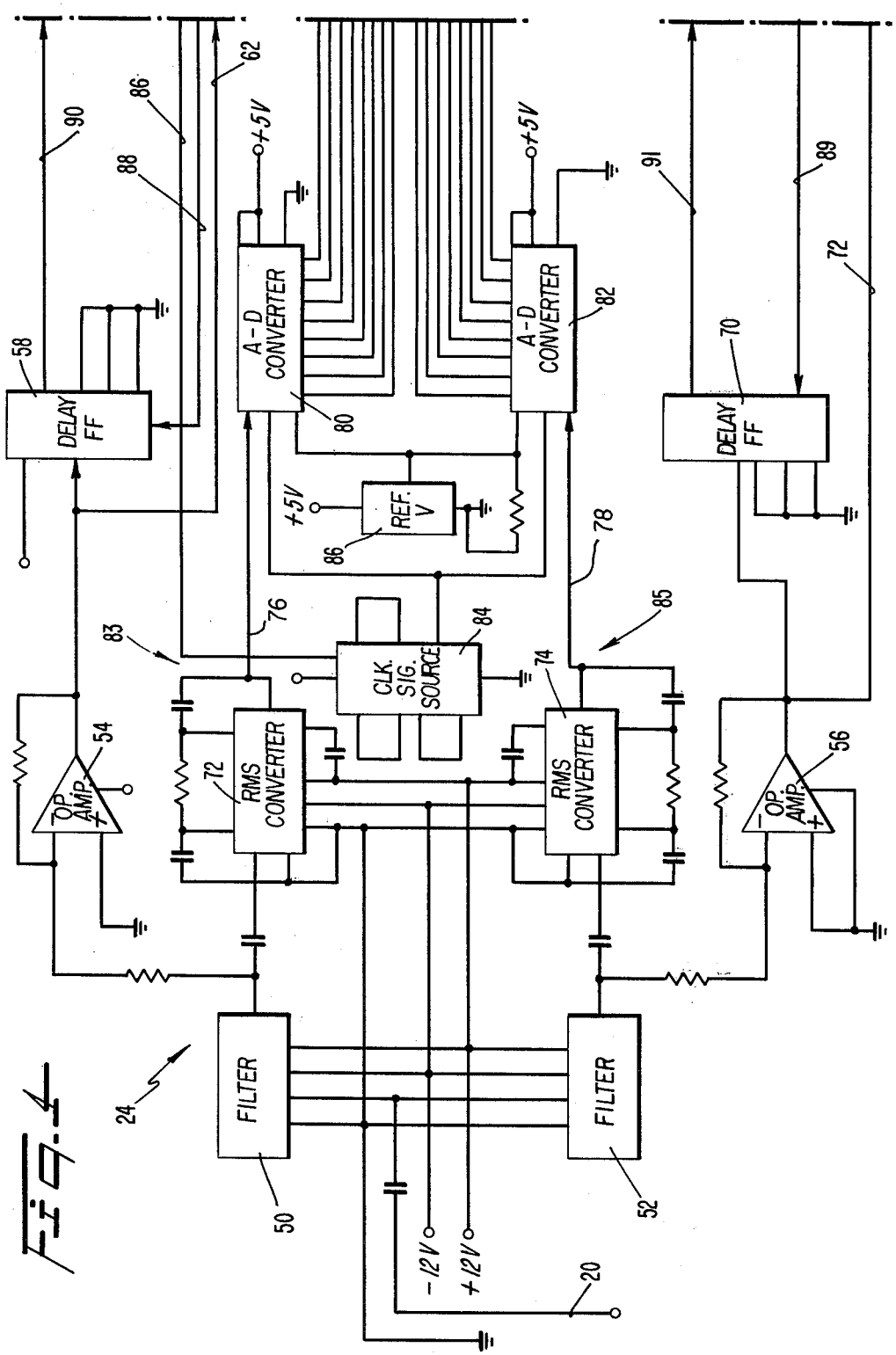
FIGS. 4 and 5 show a schematic of a multifrequency dialing board which determines the high and the low component frequencies in accordance with certain principles of the invention.

Referring to FIG. 4, the multifrequency signal is fed to the multifrequency dial board 24 over line 20. The multifrequency signal is separated into high and low frequency components signals by filter circuits 50 and 52, respectively. The high and low frequency signals are then fed to zero-crossing detectors 54 and 56, respectively. The detectors 54 and 56 are high-gain operational amplifiers. The detectors 54 and 56 convert the sinusoidal high and low frequency signals into square wave signals. The high frequency square wave signal is fed to (1) a clock (CLK) input of a delay flip-flop 58 and (2) an input port of a microprocessor circuit, designated generally by the numeral 60 (FIG. 5) over line 62. Circuits 64, 66 and 68 (FIG. 5) represent the microprocessor 60 and, as such, the circuits can operate on information received by any input on the individual circuits. Hereinafter, the circuits 64, 66 and 68 will be referred to as the microprocessor 60. Similarly, the low frequency square wave signal is fed to (1) a clock (CLK) input of a delay flip-flop 70 and (2) an input port of the microprocessor 60 over line 72.

The filter circuits 50 and 52 which perform in the foregoing manner are commercially available from Cermetak Microelectronics, Inc. of Sunnyvale, Calif. and are identified as dual-tone multifrequency group filters type CH1296. The delay flip-flops 58 and 70 which perform in the foregoing manner are commercially available from National Semiconductor of Santa Clara, Calif. and of the type 4013B. Circuits 64, 66 and 68 which perform in the foregoing are commercially available from Intel Corporation of Santa Clara, Calif. and are identified as a static RAM type 8156, an EPROM type 8755A and a CPU type 8085A, respectively.

The high and low sinusoidal frequency signals are also fed to root mean square (RMS) converters 72 and 74, respectively. RMS converters 72 and 74 generate dc voltage signals on lines 76 and 78, respectively. Each of the dc voltage signals has an amplitude proportional to a RMS value of the respective frequency signals. The dc voltage signals on lines 76 and 78 are then fed to analog-to-digital converters 80 and 82, respectively, which produce eight-bit binary outputs corresponding to the dc voltage appearing on lines 76 and 78. A divider circuit 84 feeds a clock signal to both of the converters 80 and 82 to facilitate their operation. A reference voltage circuit 86 is also coupled to the converters 80 and 82 and supplies a 1250 millivolt reference voltage thereto. Each of the eight-bit binary outputs of the converters 80 and 82 represents a numerical quantity which can range from zero to 255. The eight-bit binary outputs also represent all dc RMS voltage inputs from zero to a maximum of 1250 millivolts. For purposes of illustration, assume that the numerical quantity represented on the output of converter 80 is seventy-six (76) or 01001100 in binary form. Since there are 256 possible combinations and a maximum dc RMS voltage of 1250 millivolts, the output of converter 70 represents a voltage amplitude of 371 millivolts. The output signals of converters 80 and 82 are fed to the microprocessor 60. Converters 72 and 80 represent a high-frequency signal preparation circuit, designated generally by the numeral 83 and converters 74 and 82 represent a low-frequency signal preparation circuit, designated generally by the numeral 85.

The RMS converters 72 and 74 which perform in the foregoing manner are commercially available from Analog Devices, Inc. of Norwood, Mass. and are identified as type AD536. The analog-to-digital converters 80 and 82 are commercially available from National Semiconductor of Santa Clara, Calif. and are identified as type ADC0800.

In operation, the microprocessor 60 monitors the output signals of the converters 80 and 82 to determine when both of the output signals exceed a predetermined threshold amplitude value such as 200 millivolts. When the outputs of both of the converters 80 and 82 exceed the threshold value, this indicates that a valid multifrequency signal has been received on line 20. The microprocessor 60 then monitors the signals on lines 62 and 72 and generates enable signals on lines 88 and 89 when the corresponding square wave signals are both in a low state. The enable signals on lines 88 and 89 are fed to a delay (D) input on flip-flops 58 and 70, respectively. Once flip-flops 58 and 70 are enabled, the Q output of each flip-flop goes high on the next rising edge of the square waves. The output signal of each of the flip-flops 58 and 70 is fed to inputs of an interval timer circuit, designated generally by the numeral 92, over lines 90 and 91, respectively. The interval timer circuit 92 contains three independent sixteen-bit counters 93, 94 and 95. Counter 93 is used to determine the period of the high frequency signal, counter 94 is used to determine the period of the low frequency signal and counter 95 is used to determine an interval of time wherein the high and low frequency signals exceed the threshold value. Once the period of the high and low signals are known, the frequency of each can be determined. A 2 megahertz clock signal is fed from the microprocessor 60 over line 96 to the timer circuit 92. The clock signal facilitates the counting of the high and low frequency counters 93 and 94, respectively. Therefore, the high and low frequency counters 93 and 94, respectively, register the number of clock pulses received while the inputs are held high by flip-flops 58 and 70, respectively.

The microprocessor 60 thereafter continues to monitor lines 62 and 72 for eight complete cycles of each of the square wave signals. When the ninth low pulse is detected on lines 62 or 72, the microprocessor 60 places a low signal on the appropriate line 88 or 89. This low signal disables the appropriate flip-flop 58 or 70 and stops the appropriate counter 93 or 94 on the next rising edge of the respective square wave signal. When the microprocessor 60 has disabled both flip-flops 58 and 70, the count of high and low frequency counters 93 and 94, respectively, represents a time interval in clock pulses for eight periods of each square wave signal. The microprocessor 60 then compares the actual counts registered by the timer circuit 92 with preset time limits, in microseconds, stored in memory, to determine whether the high and low frequency component signals are within predetermined frequency limits. For purposes of illustration, eight cycles of the 1667 Hz high frequency signal should take 4800 microseconds and the microprocessor 60 may be programmed to indicate a valid input signal whenever the actual count detected by the timer circuit 92 is between 4700 and 4900 microseconds.

The comparison of the count stored in the timer circuit 92 with the preset limits is performed in sequential steps according to the stored program. First, it is determined whether the high frequency count is within any of three stored maximum and minimum count ranges corresponding to the three possible high frequency signals (FIG. 2). Thereafter, the low frequency count is compared with four stored ranges for the four possible low frequency signals. If the observed counts do not fall within the high and the low predetermined ranges, an error code appears on devices 26 and 28 (FIG. 3) which indicates that the dialing device 10 has malfunctioned.

If the stored counts indicate valid frequencies of the high and low frequency signals, the microprocessor 60 then performs two additional tests. For example, the character 5 is associated with the low frequency signal at 770 Hz and the high frequency signal 1336 Hz. When the character 5 has been dialed, the actual RMS voltages indicated by the binary outputs of converters 80 and 82 are adjusted according to the predetermined calibration factor. The adjusted RMS voltages are compared with a predetermined voltage range associated with the low frequency signal of 770 Hz, such as 250 to 400 millivolts. If the adjusted RMS voltage is within this range, the system is operating properly. If the adjusted RMS voltage is not within this range, an error code is displayed. A similar test is performed using the 1336 Hz frequency. Additionally, on all digits dialed, the duration of the binary outputs of converters 80 and 82 is timed by a clock, within the microprocessor 60, to make sure that the high and low frequency signals exist for at least 50 milliseconds but not more than 80 milliseconds. When signals appearing on the outputs of converters 80 and 82 exceed the predetermined threshold value, the microprocessor 60 facilitates (1) the interval counter 95 contained on timer circuit 92 to be set to zero and (2) a series of one millisecond pulses which is fed to the timer circuit 92 over line 98. The microprocessor 60 continues to conduct the frequency and amplitude tests described above while constantly monitoring the results stored in the interval counter 95 of the timer circuit 92. When the counter 95 has stored 50 pulses, the microprocessor 60 determines if the binary output signals on converters 80 and 82 are still valid. If the output signals are still valid, an indication of the digit dialed appears on the devices 26 and 28 (FIG. 3) indicating that the signal transmitted by the dialer 10 is valid with respect to its amplitude and frequency.

As noted above, the system 22 has the ability to automatically calibrate itself. Referring to FIG. 3, prior to the introduction and the processing of an unprocessed signal on line 20 by the dialer 10, the multifrequency dial board 24 energizes relay coil 100 to operate relay contact 46. This couples the calibration circuit 36 to transformer 48. The dial board 24 then introduces on line 38 a 770 Hz standard signal and a 1336 Hz standard signal having a known RMS amplitude of 435 millivolts. The standard signals are fed through buffers 40 and 42, potentiometer 44 and transformer 48 and enters the dial board 24 over line 20. The standard signals are thereafter processed by the appropriate signal preparation circuits 83 and 83. The microprocessor circuit 60 (FIG. 4) then monitors the binary outputs of converters 80 and 82 to determine whether the outputs of the converter each indicate an amplitude of 435 millivolts. If the outputs of the converters 80 and 82 differ from the expected 435 millivolt amplitude, the program stored in the microprocessor 60 stores the difference between the known amplitude and the determined amplitude of each of the standard signals as a calibration factor for the high and the low frequencies. Thus, the calibration factor may differ for the high and low frequencies.

For purposes of illustration, assume that the amplitude of the outputs of each of the converters 80 and 82 is 425 millivolts instead of the 435 millivolts noted above. The subsequent amplitude of a signal to be tested as indicated by the outputs of converters 80 and 82 will have 10 millivolts added to it by the microprocessor 60 prior to testing the amplitude as described above. If the outputs of converters 80 and 82 are above the expected 435 millivolts, the microprocessor 60 will reduce subsequent amplitudes prior to the testing as described above. It should be noted that only the amplitude is calibrated and not the frequency since the frequency is taken from a crystal clock 102 (FIG. 5) which normally shows little or no deviation caused by age or temperature. Moreover, if the amplitudes appearing at the outputs of converters 80 and 82 represent a wide deviation from the expected reading of 435 millivolts, for example 200 millivolts, the system 22 will automatically signal an operator on the display devices 26 and 28 which indicates the system is malfunctioning.

Although the preferred embodiment of the invention utilizes the automatic dialer 10, a manually operated device, such as a telephone set, can be substituted in its place. However, the stored program would have to be changed to anticipate a slower sequence of signals on line 20.

Referring to FIGS. 6 through 24, the flow charts illustrated therein reveal the steps of the program, which is stored in the microprocessor 60, for testing multifrequency dialing signals. Initially, the operator starts the program to control operation of the system 22 by pressing a reset button 103 (FIG. 3). Step 201 of the program establishes which ports of microprocessor 60 will be used as input ports and which ports will be used as output ports. Step 202 clears display devices 26 and 28 and step lamps 34 (FIG. 3). In step 203, the microprocessor 60 clears all relays and activates a relay coil 104 which operates relay contact 106 (FIG. 3) to apply a voltage signal of nine volts to the dialer 10 (FIG. 3). Step 204 calls a subroutine which determines if a cycle switch 105 (FIG. 3) has been activated.

Referring to FIG. 8, the flow chart illustrated therein reveals the steps of a CYCLE subroutine which delays the execution of the stored program until the cycle switch 105 is activated and all transients associated therewith have settled. Steps 205, 206 and 207 of the subroutine determine if the cycle switch 105 is in a non-activated state. If the cycle switch 105 is in an activated state, steps 205, 206 and 207 are repeated until the state of cycle switch becomes non-activated. Steps 208, 209 and 210 determine if there has been a transition from the non-activated state to the activated state of the cycle switch 105. Steps 211, 212, 213 and 214 are a sequence of steps which delays execution of the stored program for forty milliseconds and then checks the status of the cycle switch 105. If the cycle switch 105 is not activated, it is bouncing or chattering; thus, the subroutine returns to step 208 and repeats steps 208 through 214 until all transients associated with the activation of the cycle switch have settled.

Referring again to FIG. 6, after the cycle switch 105 has been activated, the control of the program is returned to step 215. Step 215 initializes the system 22 for a self-calibration routine. Relay coil 100 is activated to operate relay contact 46 (FIG. 3) which couples the self-calibration circuit 36 to the transformer 48. Step 216 calls a subroutine which delays the execution of the stored program for a predetermined amount of time to ensure that relay contact 46 has settled.

Figure 5:
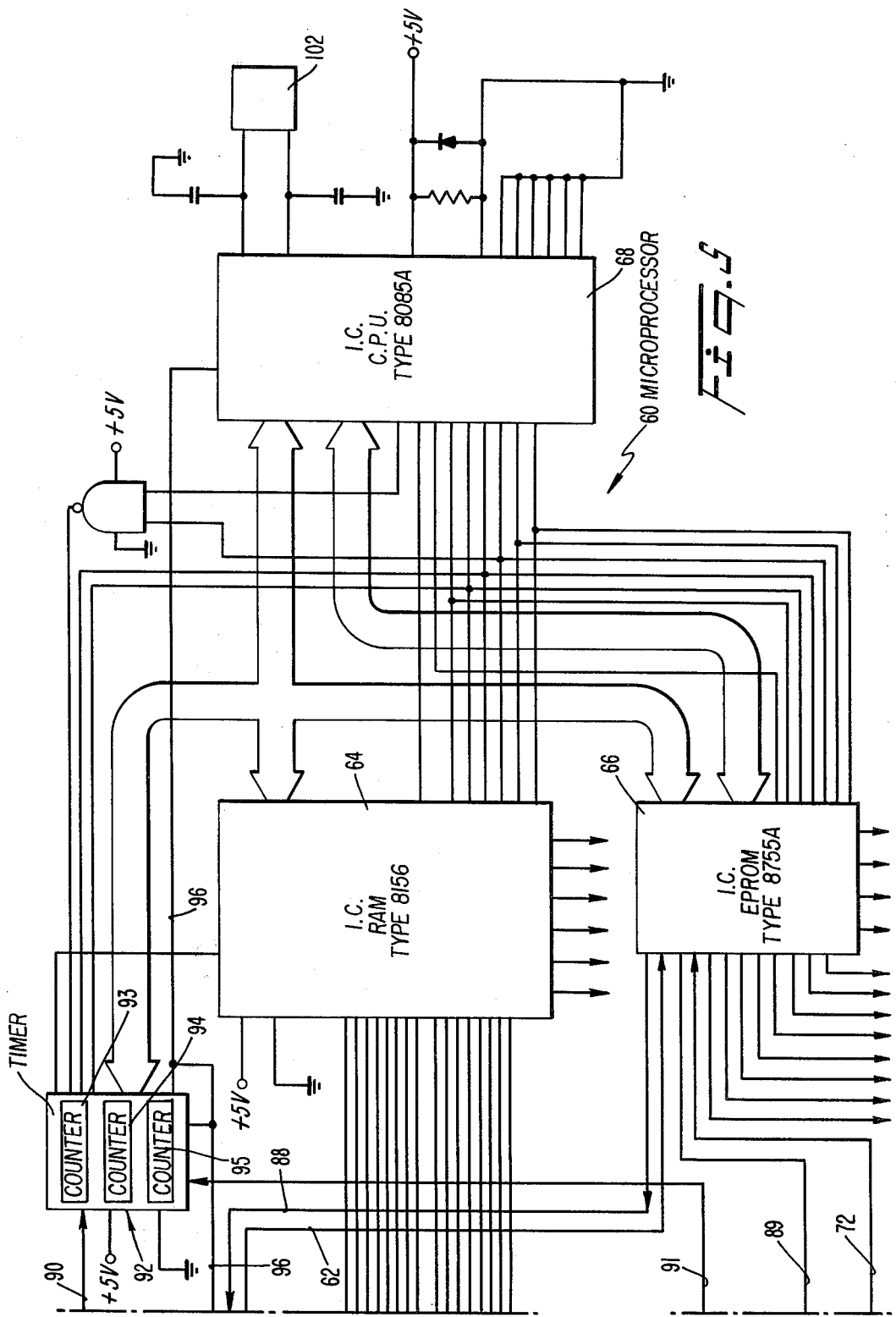
Figure 6:
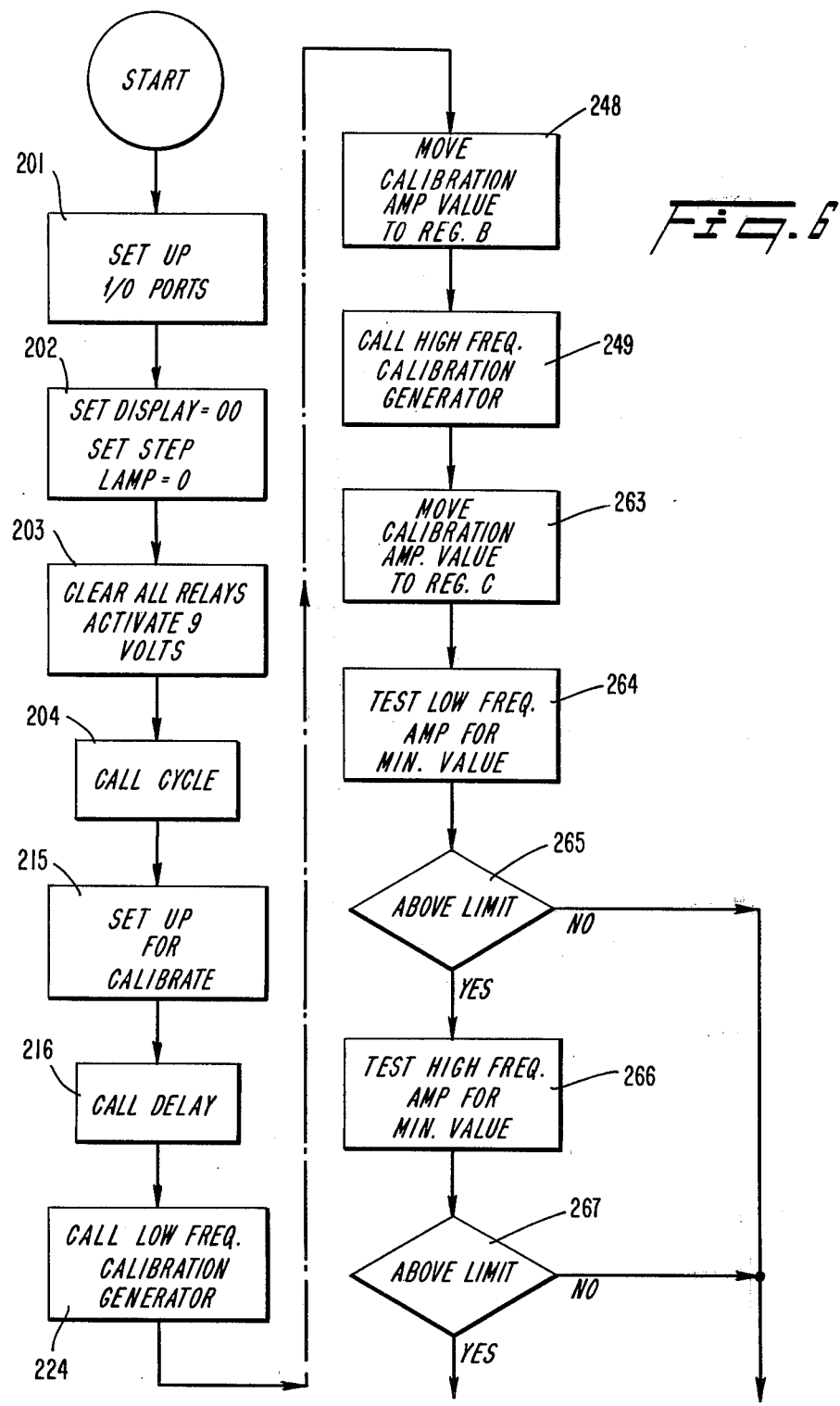

Referring to FIG. 9, the flow chart illustrated therein reveals the steps of a DELAY subroutine which allows for settling of the relay contact 46. Step 217 saves the contents of registers B and C. Step 218 transfers to register C the contents of an accumulator, which contains a value which is equivalent to the delay in milliseconds. Step 219 facilitates the setting of a timer included in the microprocessor 60 to generate a sequence of one millisecond pulses on line 98 (FIG. 5). The pulses facilitate the counting of the interval counter 95 contained in the timer circuit 92. In step 220, the counter 95 starts its counting operation. In step 221, a test is performed to determined if the counter 95 has attained a zero state. Steps 222 and 223 determines the contents of the counter 95 which is then compared to the contents of register C. When the value of the counter 95 is equivalent to the value stored in register C, the predetermined delay time has expired and execution is returned to step 224 (FIG. 6).

Step 224 (FIG. 6) calls a subroutine for generating the low frequency calibration factor. Referring to FIG. 10, the flow chart illustrated therein reveals the steps of a LCAL subroutine. Step 225 facilitates the generation of a 770 Hz square wave signal by the timer (not shown) contained on the microprocessor 60. The square wave signal, which is fed over line 98, facilitates the operation of the interval counter 95 contained on timer circuit 92. Step 226 calls a subroutine which facilitates the generation of a 770 Hz square wave standard signal on line 38 (FIG. 3).

Referring to FIG. 11, the flow chart illustrated therein reveals the steps of a WAIT subroutine which facilitates the generation of a low frequency calibration standard signal. Steps 227 and 228 starts the counting operation of the counter 95 of timer circuit 92 and tests the contents of the counter for a count of zero, respectively. Once the counter 95 has the count of zero, steps 229 and 230 determine the count of the counter and compares the count with the value presently stored in register D. If the two values are not equal, step 231 stores the count in register D. Step 232 compares the count stored in register D with a count value of 190. The count value of 190 is an arbitrary value which implies that once the count stored in register D has attained a value of 190, the generated square wave standard signal normally will not include any transients. If the count stored in register D is not equal to 190, step 233 masks off all but the bit zero of register D. Step 234 determines the value of bit zero. If bit zero has a value of zero, step 235 facilitates the generation of a low signal on line 30 (FIG. 2). If bit zero has a value of one, step 236 facilitates the generation of a high signal on line 38. Thereafter steps 229 through 234 are repeated until the value of the count in step 232 is equal to the count value of 190. Since the counter 95 is being driven by a 770 Hz signal, bit zero is changing at a rate of 770 times per second which produces a square wave standard signal on line 38 having a frequency of 770 Hz. Thereafter, the square wave signal appearing on line 38 is fed through buffers 40 and 42 (FIG. 2), transformer 48 and over line 20 to the multifrequency dial board 24. Moreover, the square wave standard signal appearing on line 20 was generated to have a known RMS amplitude such as 435 millivolts. The square wave then is transformed into a sinusoidal waveform by the filter circuit 52 (FIG. 4). Subsequently, the RMS voltage amplitude appears on the binary outputs of converter 82 (FIG. 4). Once the counter 95 has attained a value of 190, control of the program returns to step 237 (FIG. 10).

Step 237 of FIG. 10 calls a subroutine READL which determines whether the amplitude of the signal appearing on the binary outputs of the converter 82 is valid. Referring to FIG. 12, the flow chart illustrated therein reveals the steps of the READL subroutine. Step 238 saves the contents of registers B and C. Step 239 reads the RMS amplitude value appearing on the binary outputs of converter 82. Step 240 saves the amplitude value in register B. In step 241 a test is performed to determine if the RMS amplitude exceeds the predetermined threshold value of 200 millivolts. If the RMS amplitude does not exceed the threshold value, the outputs of the converter 82 does not represent a signal. Thus, step 246 clears the accumulator while step 247 restores the contents of registers B and C and returns control of the program to step 248. However, if the RMS amplitude exceeds the threshold value, step 242 delays execution of the program for 20 microseconds while step 243 reads the RMS amplitude value again. In step 244 a test is performed to determine if the RMS value now stored in the accumulator is equal to the value previously read and which is stored in register B. If the two values do not agree, the first value was read during a transistion and steps 239 through 244 are repeated until the value stored in register B and the value in the accumulator agree. Step 245 restores the contents of registers B and C to their original values. Thereafter, the control of the program is returned to step 248 of FIG. 6.

Referring again to FIG. 6, step 248 stores the low frequency calibration factor, which is now the contents of the accumulator, in register B. Step 249 calls a subroutine HCAL which generates the high frequency calibration factor. Referring to FIG. 13, the flow chart illustrated therein reveals the steps of the HCAL subroutine. Step 250 facilitates the generation of a 1336 Hz square wave signal by the timer contained on the microprocessor 60. Subroutine HCAL is very similar in operation to subroutine LCAL illustrated in FIG. 9 and described above. Step 251 calls the WAIT subroutine which is described above and is illustrated in FIG. 11. Step 252 calls a subroutine READH which determines whether the amplitude of the signal appearing on the binary outputs of the converter 80 is valid. Referring to FIG. 14, steps 253 through 262 are similar in operation to steps 238 through 247 of subroutine READL of FIG. 11 described above. Once the HCAL subroutine has completed its execution, control of the program returns to step 263 of FIG. 6.

Referring to FIG. 6, step 263 stores the high frequency calibration factor, which is stored in the accumulator as a result of subroutine HCAL, in register C. Steps 264 and 265 performs a test which determines whether the low frequency calibration factor is greater than an acceptable minimum amplitude value. If the calibration value is not greater than the acceptable minimum value, step 272 facilitates the generation of an error code which is displayed on devices 26 and 28 (FIG. 3). However, if the low frequency calibration factor exceeds the minimum value, steps 266 and 267 test the high frequency calibration factor to determine if it is above a minimum acceptable value. Steps 268 through 271 test the low and high calibration values to determine if each calibration factor is below a maximum acceptable calibration value, respectively. If either of the tests regarding the calibration values fails, step 272 facilitates the generation of an error code which is displayed on devices 26 and 28. Step 273 calls the CYCLE subroutine if an error code has been generated. Steps 274 and 275 stores the low and high frequency calibration factors in memory if the low and the high frequency calibration factors are within their respective acceptable ranges. Step 276 de-energizes relay coil 100; thus, uncoupling the self-adjust circuit 36 from the transformer 48. Thereafter, multifrequency signals from the dialer 10 are fed over line 20 to the dial board 24. Step 277 increments the step lamps 34 to indicate phase 1 of the testing procedure is being executed. This phase of the testing procedure checks for valid high and low frequency signals and displays the character represented by the multifrequency signal. Step 278 determines if the cycle switch 105 is now non-activated as a result of step 273. Step 279 calls a subroutine which determines if the multifrequency signals appearing on line 20 include valid high and low frequency components.

Figure 15:
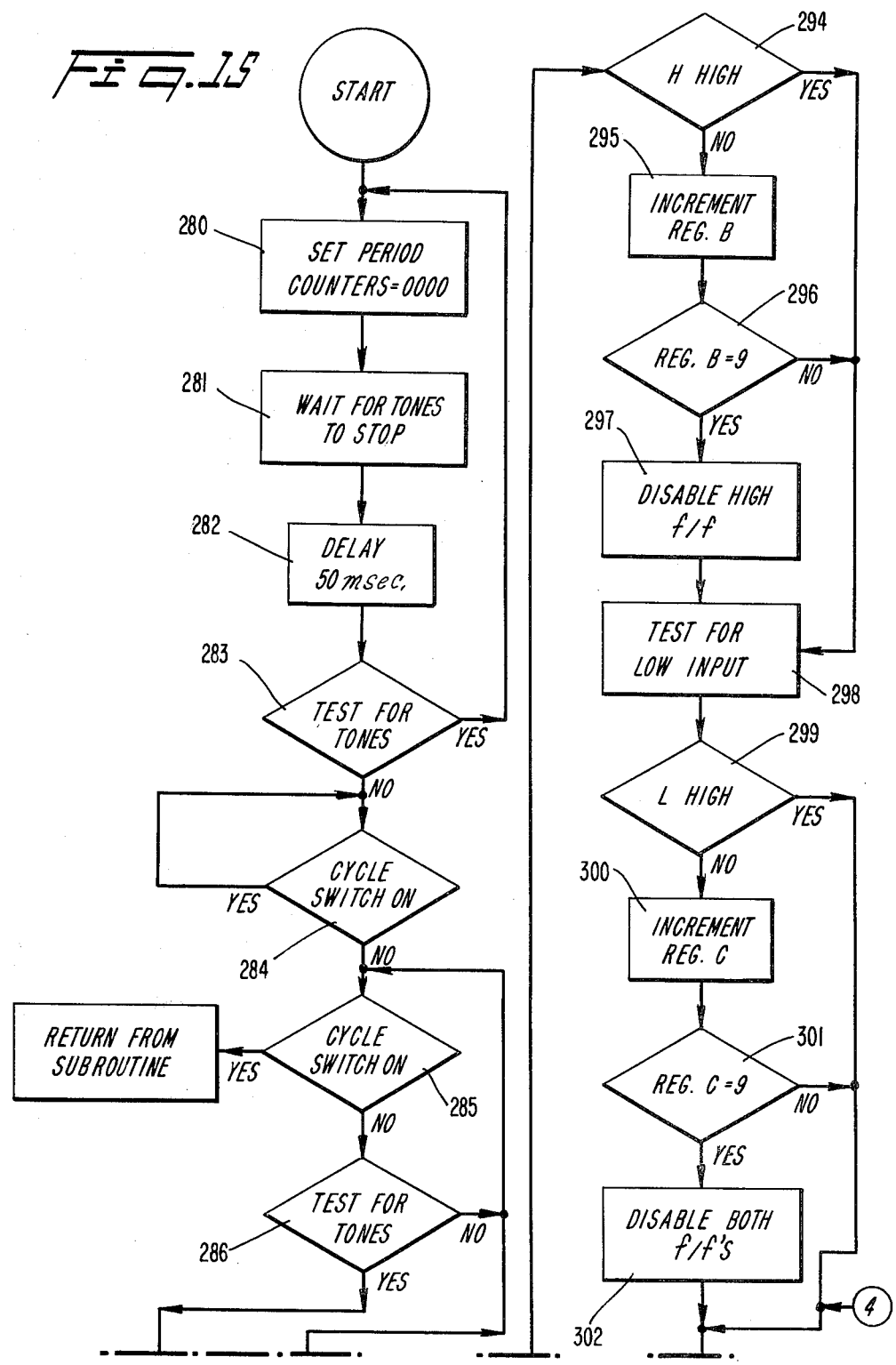
Figure 16:
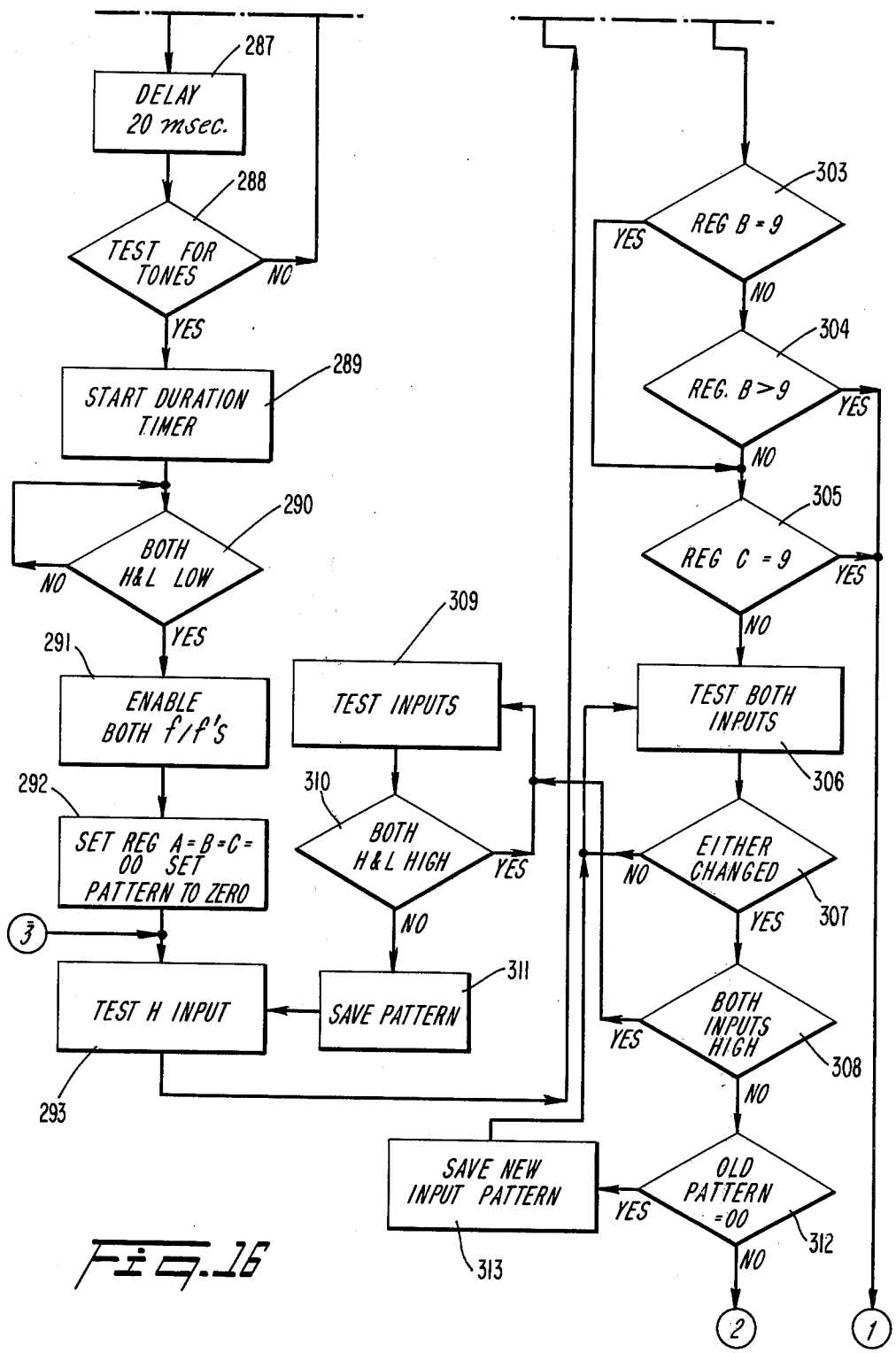

Referring to FIGS. 15 and 16, the flow chart illustrated therein reveals the steps of the DIAL TEST subroutine which determines if the high and low frequency components of the multifrequency signal are within acceptable ranges. As noted above, the multifrequency signals, which are generated in a predetermined sequence by the dialer 10, are fed to the multifrequency dial board 24. Step 280 facilitates the initialization of the high and low frequency counters 93 and 94, respectively, formed on timer circuit 92 to a value of zero. Steps 282 through 283 delay execution of the DIAL TEST subroutine until the beginning of a multifrequency signal. As noted above, the multifrequency signals are generated in a predetermined sequence. There is at least sixty milliseconds between the signals that make up the predetermined sequence. Therefore, steps 282 through 283 determine if a signal is present and wait for the signal to end prior to allowing the execution to continue. Step 284 determines if the cycle switch 105 is activated and delays further execution of the subroutine until the switch is de-activated. Steps 286 through 288 delay the execution of the subroutine until all transients of the signal have settled and terminates the execution of the subroutine if the cycle switch 105 is activated. Step 289 starts the interval counter 95 to measure the time interval in which high and low frequency signals exceed the threshold value. Step 290 determines when the square wave signals on lines 62 and 72 (FIG. 4) are both in a low state in order to simultaneously start the high and low frequency counters 93 and 94, respectively (FIG. 5). Step 291 enables flip-flops 58 and 70 (FIG. 4) while step 292 resets registers A, B and C. Steps 293 and 294 determine the state of the high frequency square wave signal present on line 62 (FIG. 4). Step 295 increments register B if the square wave signal is in a low state. As noted above, the microprocessor 60 monitors the high and low frequency square wave signals present on lines 62 and 72, respectively, for eight complete cycles.

In the DIAL TEST subroutine, the number of transistions through or occurrences of the low state of each square wave signal is counted. Thus for eight complete cycles, there will be nine transistions through the low state. Step 296 determines if nine transistions of the high frequency square wave have occurred and step 297 disables flip-flop 58 if the determination is positive. Otherwise, steps 298 and 299 determine the state of the low frequency square wave signal present on line 72 (FIG. 4). Steps 300 through 302 perform the same function for the low frequency signal as steps 295 through 297 described above except step 302 disables flip-flop 70. The number of transistions of the low frequency signal is stored in register C. Steps 303 through 305 determine whether the value stored in register B is equal to or greater than a value of nine and whether the value stored in register C is equal to a value of nine, respectively. If the value stored in register B is not equal to or greater than the value of nine and the value stored in register C is not equal to a value of nine, steps 306 and 307 determine whether the state of either the high or the low frequency signal has changed and delays execution of the subroutine until a change in either or both signals have occurred. Step 308 determines if both signals are in a high state. Steps 309 and 310 delay the execution of the subroutine if both signals are in a high state. When one of the signals changes, step 311 stores the pattern of the signal. For example, if the low frequency is in a high (1) state and the high frequency signal is in a low state (0), the pattern saved is a binary representation 10. Thereafter steps 293 through 308 are repreated as discussed above. However, if both signals were not high in step 308, step 312 determines whether the stored pattern is a binary representation 00 and step 313 stores the present state of the signals as a new pattern if the determination in step 312 is positive. Steps 306 through 308 are repeated if a new pattern is stored.

Figure 17:
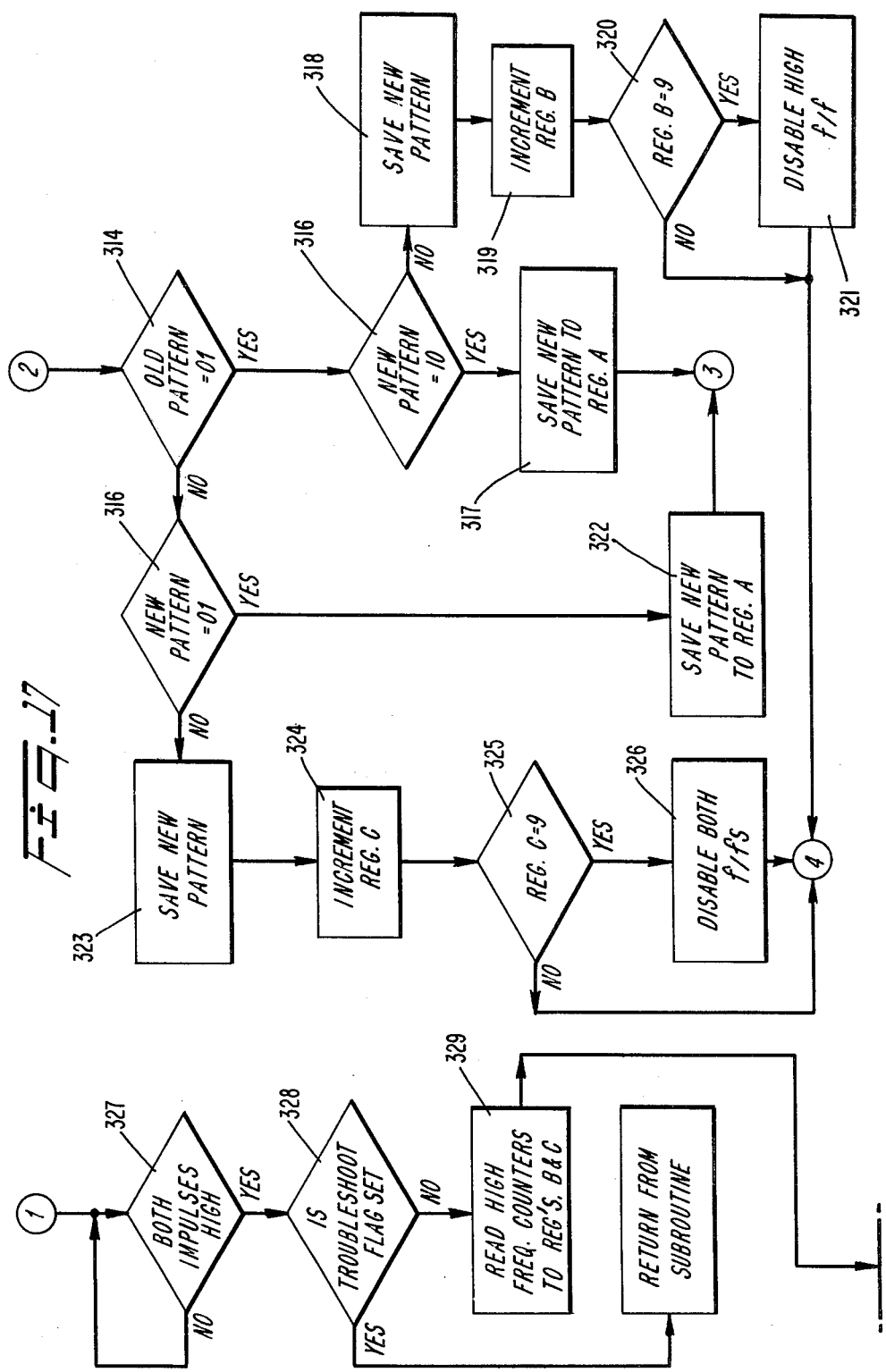
Figure 18:
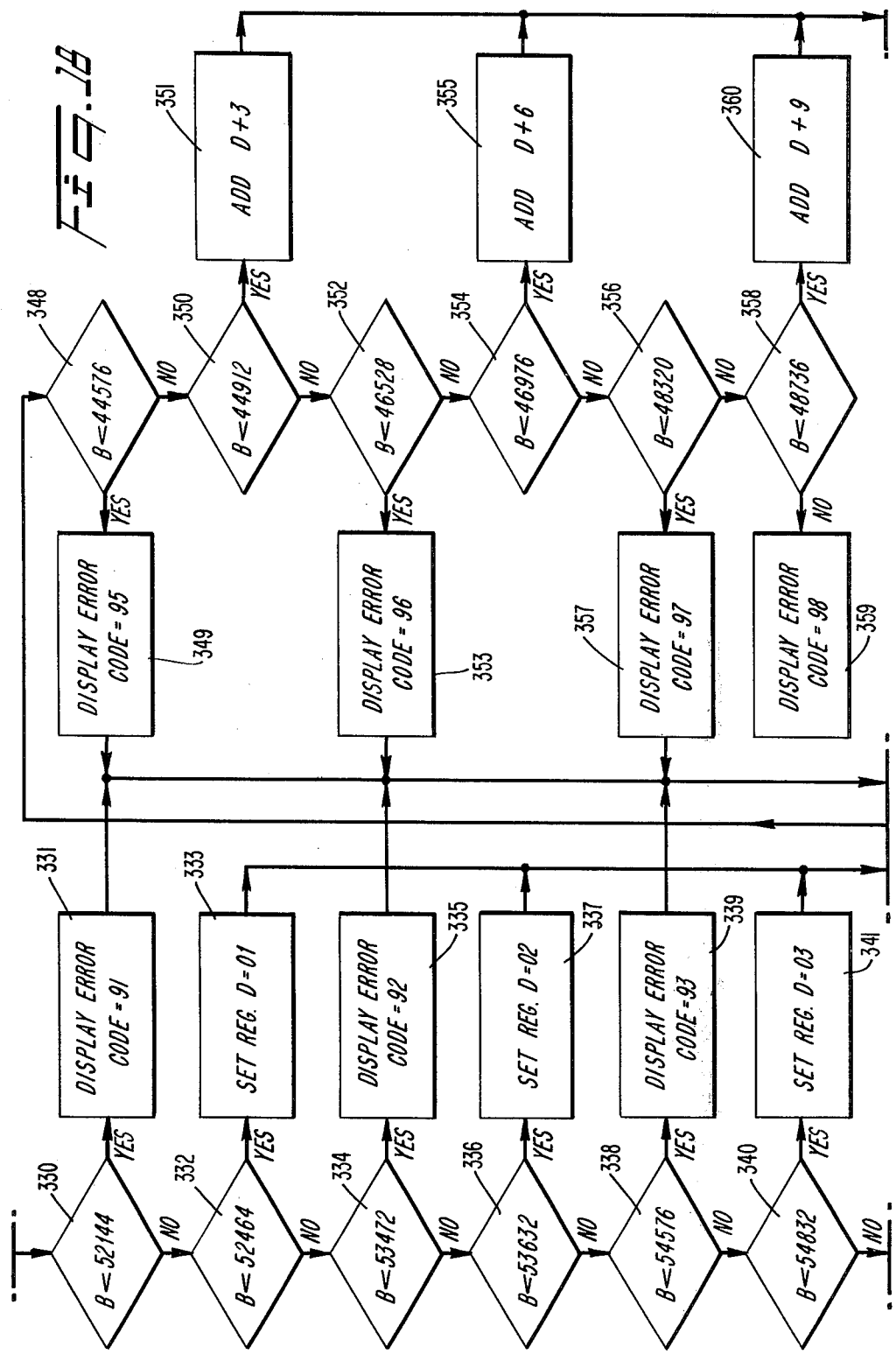
Figure 19:
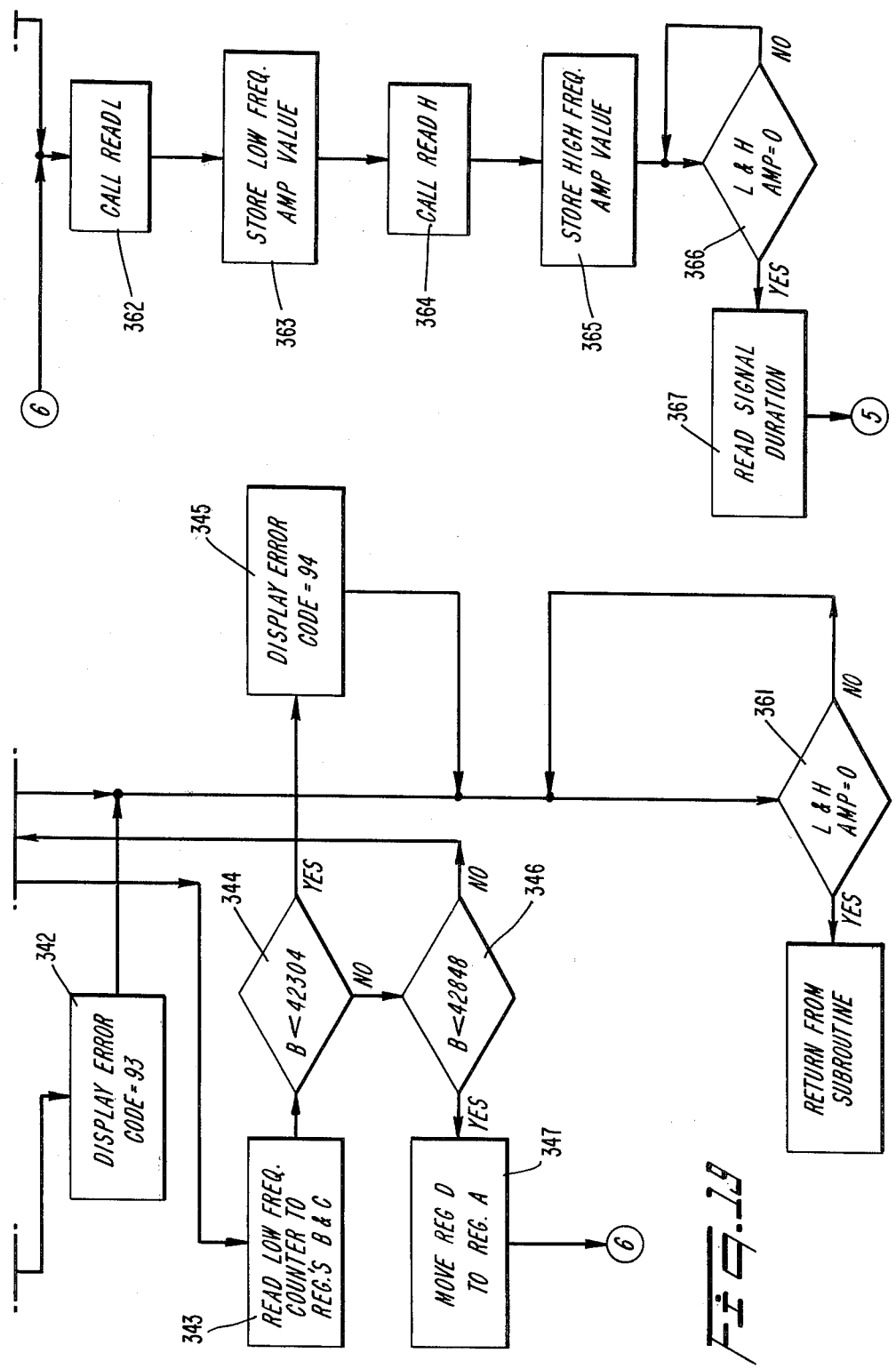
Figure 21:
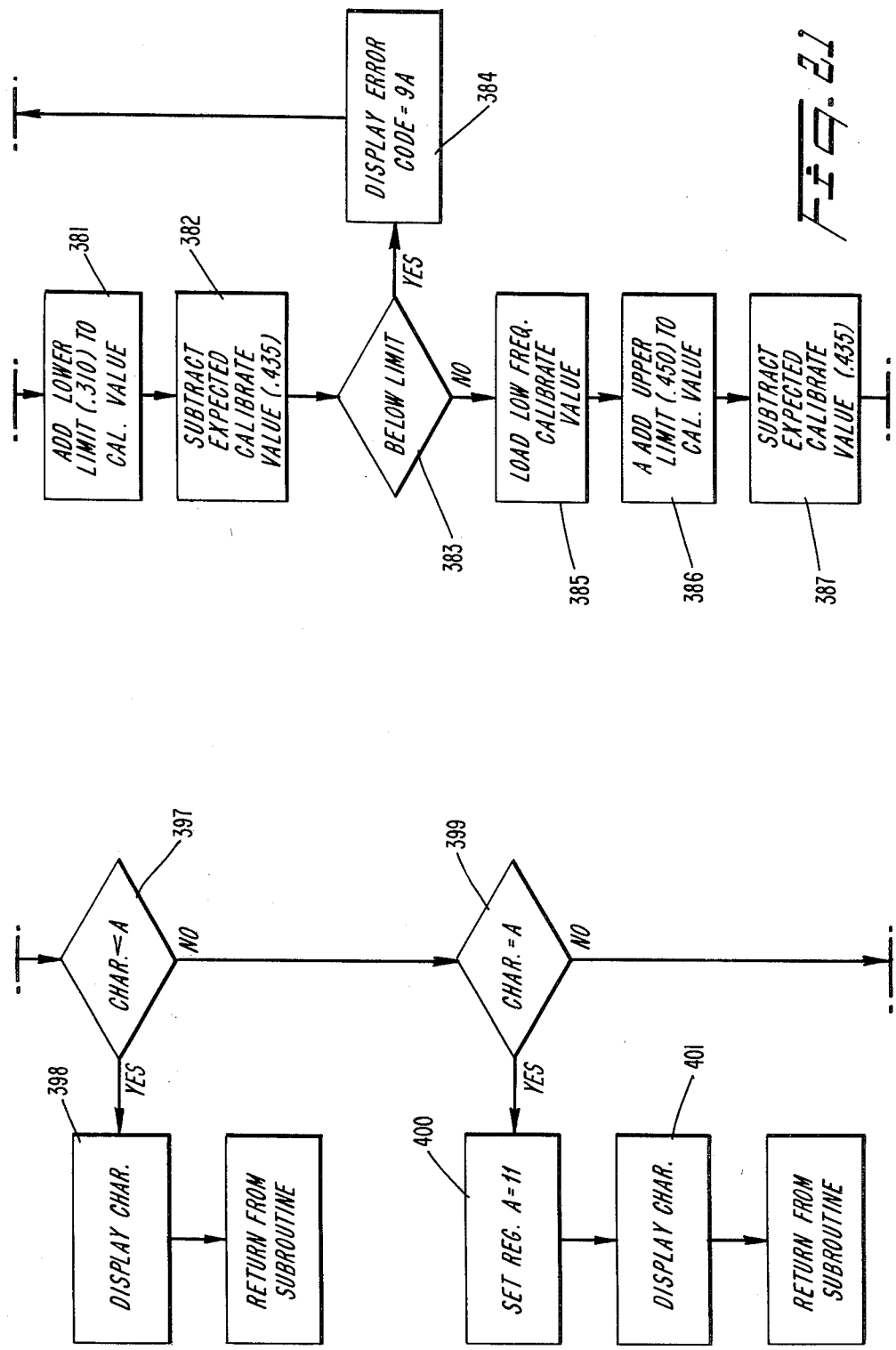
Figure 22:
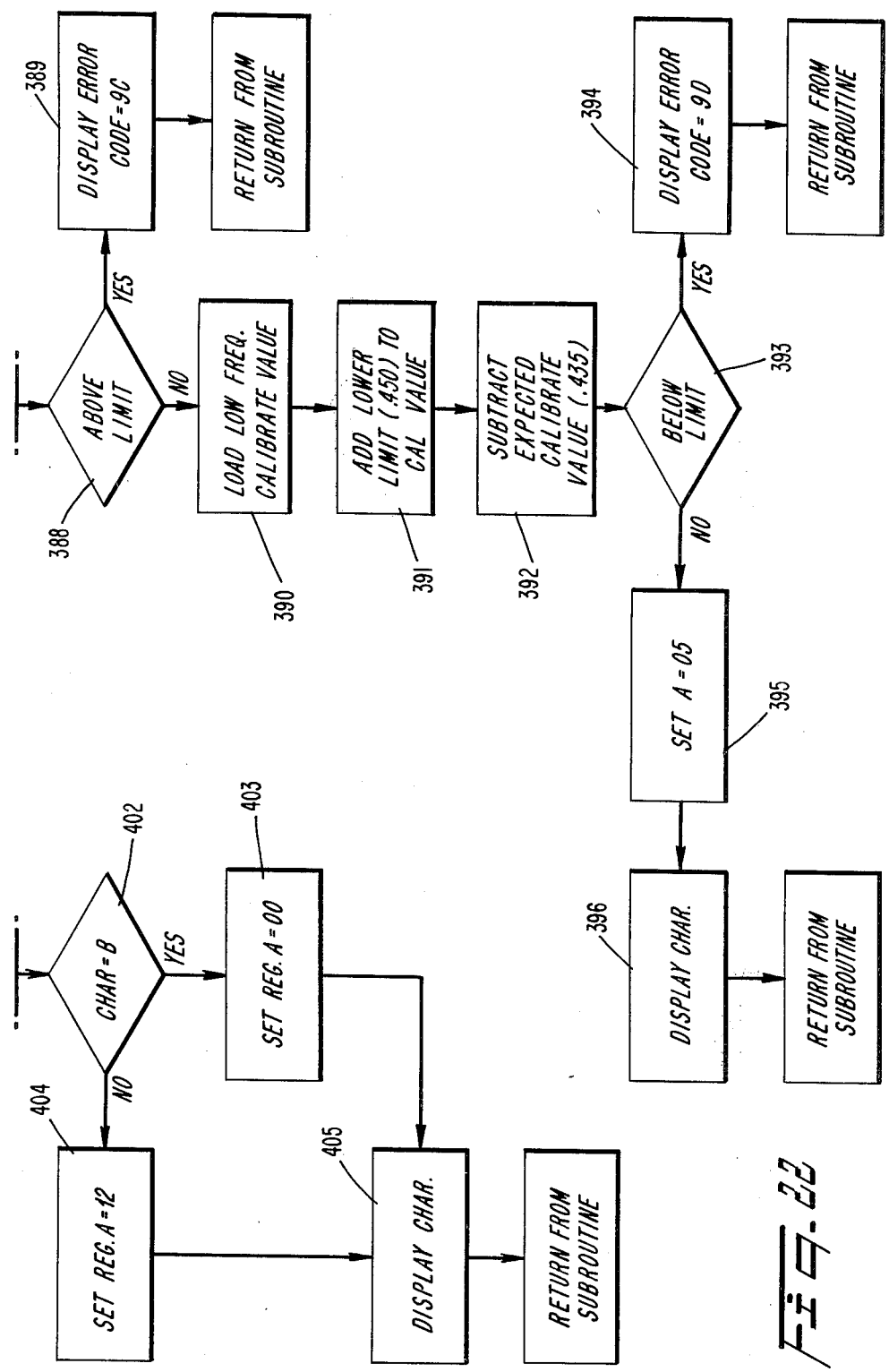

Referring to FIG. 17, if the stored pattern was not 00 in step 312 (FIG. 16), steps 314 through 316 determine whether the stored pattern is 01 and whether the present pattern is 10 or 01, respectively. If the stored pattern is 01 and the present pattern is 10, step 317 stores the present pattern and transfers execution of the subroutine to step 293 (FIG. 16). However, if the present pattern was not 10 in step 315, step 318 stores the present pattern. Steps 319 and 320 increments register B and determines whether the value stored in register B is equal to a value of nine. Step 321 disables flip-flop 58 (FIG. 4), if the value stored in register B is equal to a value of nine and transfers execution of the subroutine to step 303 (FIG. 16). Otherwise, execution is transferred from step 320 to step 303 (FIG. 16). Step 322 stores the present pattern and transfers execution of the subroutine to step 293 (FIG. 16) if the stored pattern in step 314 was not 01 and the present pattern in step 316 is 01. However, if the present pattern in step 316 was not 01, steps 323 and 324 stores the present pattern and increment the value stored in register C, respectively. Step 325 determines whether register C contains a value of nine. Step 326 disables flip-flops 58 and 70 (FIG. 4) and transfers execution of the subroutine to step 303 (FIG. 16). If the value in register C in step 325 was not nine, execution of the subroutine is also transferred to step 303 (FIG. 16). Steps 293 through 326 or a subset thereof are repeated until registers B and C each contain a value of nine.

When the value stored in register B exceeds the value of nine or the value stored in register C is equal to the value of nine, execution of the subroutine is transferred from steps 304 and 305 (FIG. 16), respectively, to step 327. Step 328 determines whether a maintenance flag has been set. Step 329 stores the contents of the high frequency counter 93 in registers B and C combined and which hereafter will be referred to as B-C register pair. The high and low frequency counters 93 and 94, respectively, are sixteen-bit count-down type. Thus, each time the counter 93 and 94 are clocked, each counts down from 65,536 which is two to the sixteenth power and is the highest number attainable by the counters. As noted above, both the high and the low frequency counters 93 and 94 are enabled for eight complete cycles of the high and low frequency square waves, respectively. Both of the counters 93 and 94 are clocked by the two megahertz clock signal appearing on line 86 (FIG. 5). Thus, the high and low frequency counters 93 and 94 each contain a count of the number of pulses of the clock signal which represent the time required for eight cycles of the high and low frequency signals, respectively.

Referring to FIGS. 18 through 22, steps 330 through 342 determine whether the high frequency signal is within an acceptable range of one of the high group frequencies 1209 Hz, 1336 Hz and 1477 Hz. Steps 330 through 333 determine if the high frequency signal is within a frequency range of 1195 Hz and 1224 Hz. Step 330 determines whether the value of high frequency counter 93 is less than a value of 52,144. As noted above, the high frequency counter is a sixteen-bit count-down type. Thus, to determine the frequency which the count of the high frequency counter 93 represents, one must determine the time required for one cycle of the high frequency by (1) subtracting the count from 65,536, (2) dividing the difference by eight in order to get the count for one cycle, and (3) multiplying the quotient by 0.5 to get the time of each cycle because each pulse represents a 0.5 microsecond period due to the 2 megahertz clock signal. The frequency is the reciprocal of the time of one cycle.

Using the procedure described above, a count of 52,144 in step 330 represents a frequency of 1195 Hz which is the lower end of the frequency range for the frequency signal of 1209 Hz. If the count is below 52,144 in step 330, step 331 displays an error code on devices 26 and 28 (FIG. 3). Step 332 determines if the count is less than 52,464 which represents a frequency of 1224 Hz. Step 333 sets the contents of register D equal to a value of one. Steps 334 through 337 determine if the contents of the B-C register pair is within a second range of 53,472 (1326 Hz) and 53,632 (1344 Hz). Step 335 displays an error code if the contents of the B-C register pair is less than 53,472 and step 337 sets the contents of register D equal to a value of two if the count is within the second range. Steps 338 through 342 determine if the contents of the B-C register pair is within a third range of 54,576 (1460 Hz) and 54,832 (1495 Hz). Steps 339 and 342 display error codes if the contents of the B-C register pair is below 54,576 or greater than 54,832, respectively. Step 341 sets the contents of register D equal to a value of three if the count is within the third range.

Steps 343 through 360 determine whether the low frequency signal is within an acceptable range of one of the low group frequencies 697 Hz, 770 Hz, 852 Hz and 941 Hz. Step 343 stores the contents of the low frequency counter 94 in the B-C register pair. Steps 344 through 346 determine if the contents of the B-C register pair is within a first low frequency range of 42,304 (689 Hz) and 42,848 (705 Hz). Step 345 facilitate the display of an error code, if the contents of the B-C register pair is below 42,304 (689 Hz). Step 347 moves the contents of register D to register A and transfers execution of the subroutine to step 361. The transfer indicates that the high and the low frequency signals have been identified as within acceptable frequency ranges and the value stored in register A is the digit which is representative of the combination of the high and low frequencies. Otherwise, steps 348 through 351 determine whether the contents of the B-C register pair is within a second low frequency range of 44,576 (763 Hz) and 44,912 (776 Hz). Step 349 facilitates the display of an error code if the contents of the B-C register pair is less than 44,576.

Step 351 increments register D by a value of three if the contents of the B-C register pair is within a third low frequency range of 46,528 (841 Hz) and 46,976 (862 Hz). Step 353 facilitates the display of an error code if the contents of the B-C register pair is less than 46,528. Step 355 increments register D by a value of six if the contents of the B-C register pair is less than 46,976. Steps 356 through 360 determine whether the contents of the B-C register pair is within a fourth low frequency range of 48,320 (929 Hz) and 48,736 (952 Hz). Steps 357 and 359 facilitate the display of error codes if the contents of the B-C register pair is less than 48,320 or exceed 48,736, respectively. Step 360 increments register D by a value of nine if the contents of the B-C register pair is less than 48,736. If an error code is generated, step 361 delays the termination of the execution of the subroutine until the high and low frequency signals cease.

Once it has been determined that the high and low frequency signals are within an acceptable high and low range, respectively, and stores an appropriate value in register D, step 362 calls subroutine READL. As noted above, subroutine READL determines the amplitude of the low frequency signal. Step 363 stores the low frequency amplitude value in memory. Step 364 calls subroutines READH, which determines the amplitude of the high frequency signal while step 365 stores that amplitude value. Step 366 delays execution of the subroutine until both the high and the low frequency signals have ceased. Step 367 facilitates the reading of the duration counter and step 368 determines whether the counter has exceeded a value of 54 which is equivalent to a minimum duration of 54 milliseconds. Step 368 facilitates the display of an error code if the duration of the multifrequency signal is less than 54 milliseconds. Step 370 transfers execution of the subroutine to step 374 if a maximum duration flag is not set. Otherwise, step 371 determines whether the character represented by the value stored in register D is the last character in the predetermined sequence and transfers execution of the subroutine to step 374. This transfer is performed because the last character usually has a transient associated with it. Step 372 determines whether a maximum duration of 85 milliseconds has been exceeded while step 373 facilitates the display of an error signal if the maximum duration was exceeded. Execution is transferred from step 374 to step 375 if the character represented by the value stored in register D is the character five.

Steps 375 through 384 facilitate the adjustment of the range of the high frequency maximum and minimum amplitude values utilizing the high frequency calibration factor. This adjustment is made to compensate for components which vary due to age or temperature change. Step 375 loads the accumulator with the high frequency calibration factor. Steps 376 and 377 facilitate adding the maximum amplitude value to the calibration factor and subtracting the expected amplitude value from the sum. The change in the maximum amplitude value depends on whether the calibration factor is greater or less than the expected value. Step 378 compares the high frequency amplitude value, which was measured and determined in memory in step 365, with the adjusted maximum high frequency amplitude value. If the measured value exceeds the maximum adjusted value, step 379 facilitates the display of an error code. Otherwise, step 380 loads the accumulator with the high frequency calibration factor. Steps 381 and 382 facilitate adding the minimum amplitude value to the low frequency calibration factor and subtracting the expected value from that sum. Step 383 compares the measured high frequency amplitude value with the adjusted minimum high frequency amplitude value. Step 384 facilitates the display of an error code if the measured value is less than the minimum adjusted amplitude value.

Steps 385 through 394 facilitate the adjustment of the range of the low frequency maximum and minimum amplitude values utilizing the low frequency calibration factor. This portion of the subroutine adjusts the low frequency maximum and minimum amplitude values and compares those values with the low frequency value measured and determined in step 363 in a similar manner described above for the high frequency amplitude values in steps 375 through 384. Steps 395 and 396 sets the contents of register A equal to a value of five and displays that value on devices 26 and 28.

However, if the character represented by the value stored in register D was not the character five in step 374, step 397 determines whether the character is less than A, which is the hexidecimal equivalent of the numeral ten. As noted above, multifrequency signals representing characters are fed to the system 22 in the predetermined sequence. The predetermined sequence consists of characters 1 through 9, 0, *, # and 1 through 4 for a total of sixteen characters. Referring again to FIG. 2, each frequency of the low and high frequency group are each associated with a weight. Thus the character represented by a multifrequency signal can be determined by adding the weights associated with its high and the low frequency signals. As the high and low frequencies were selected, as noted above, an appropriate weight associated with the frequency was either inserted into register D or added to the contents thereof. As illustrated in the matrix 21 (FIG. 2), for the first nine characters, the identification of the character is just the sum of the weights associated with its high and low frequency signals. However, the order of the next two characters, # and 0, in the predetermined sequence is different from their position in the matrix 21. Thus, step 398 facilitates the display of the character if the character is less than ten. Step 399 determines if the character has the value of ten which is a combination of weights 9 and 1. This combination represents the character asterisk (*) which is in the tenth position in the matrix 21 (FIG. 2) but the eleventh position in the predetermined sequence. Thus, steps 400 and 401 facilitate the setting of register A to a value of eleven and displaying the contents thereof. Steps 402 determines if the character has a hexidecimal value of B which is equivalent to a decimal value of eleven. Step 403 sets the contents of register A to a value of zero if the character has a value of eleven. Otherwise, step 404 sets the contents of a value of twelve. Step 405 facilitates the display of the contents of register A.

Referring again to FIG. 7, step 406 facilitates the transfer of execution to the DIAL TEST subroutine if the cycle switch 105 has not been activated. In order to continue execution of the program beyond the DIAL TEST subroutine, the operator must manually activate the cycle switch 105. Step 407 increments the step lamps 34 to indicate that phase 2 of the testing procedure is being executed. This phase of the testing procedure (1) checks for valid high and low frequency signals, (2) displays the character represented by the multifrequency signal and (3) determines if the character appears in the correct order in the predetermined sequence. Step 408 sets the maximum duration flag. Step 409 clears the display devices 26 and 28. Step 410 calls the DIAL SEQUENCE subroutine which determines if the order of appearance of the characters, which are represented by the sequence of multifrequency signals, is correct.

Figure 23:
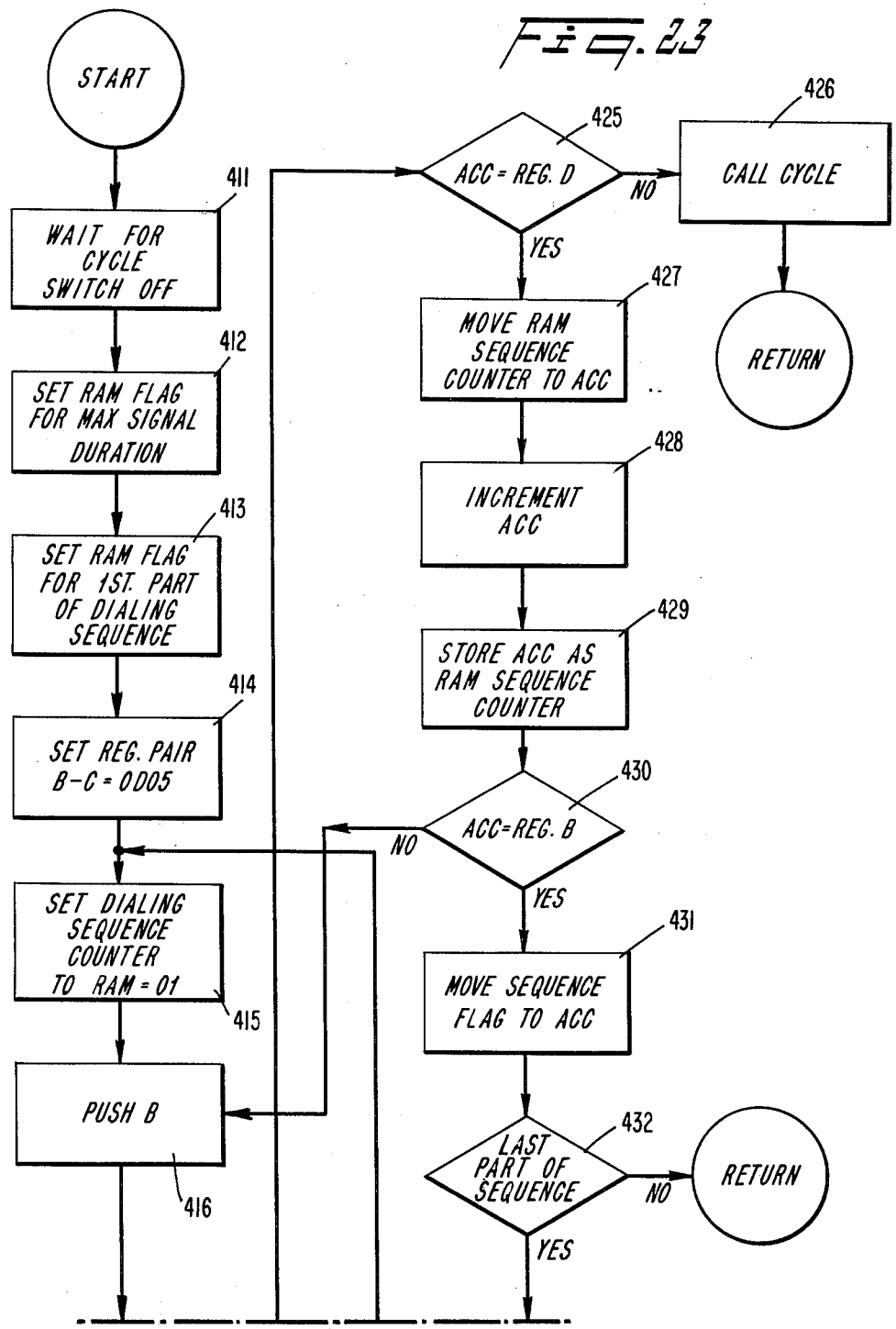
Figure 24:
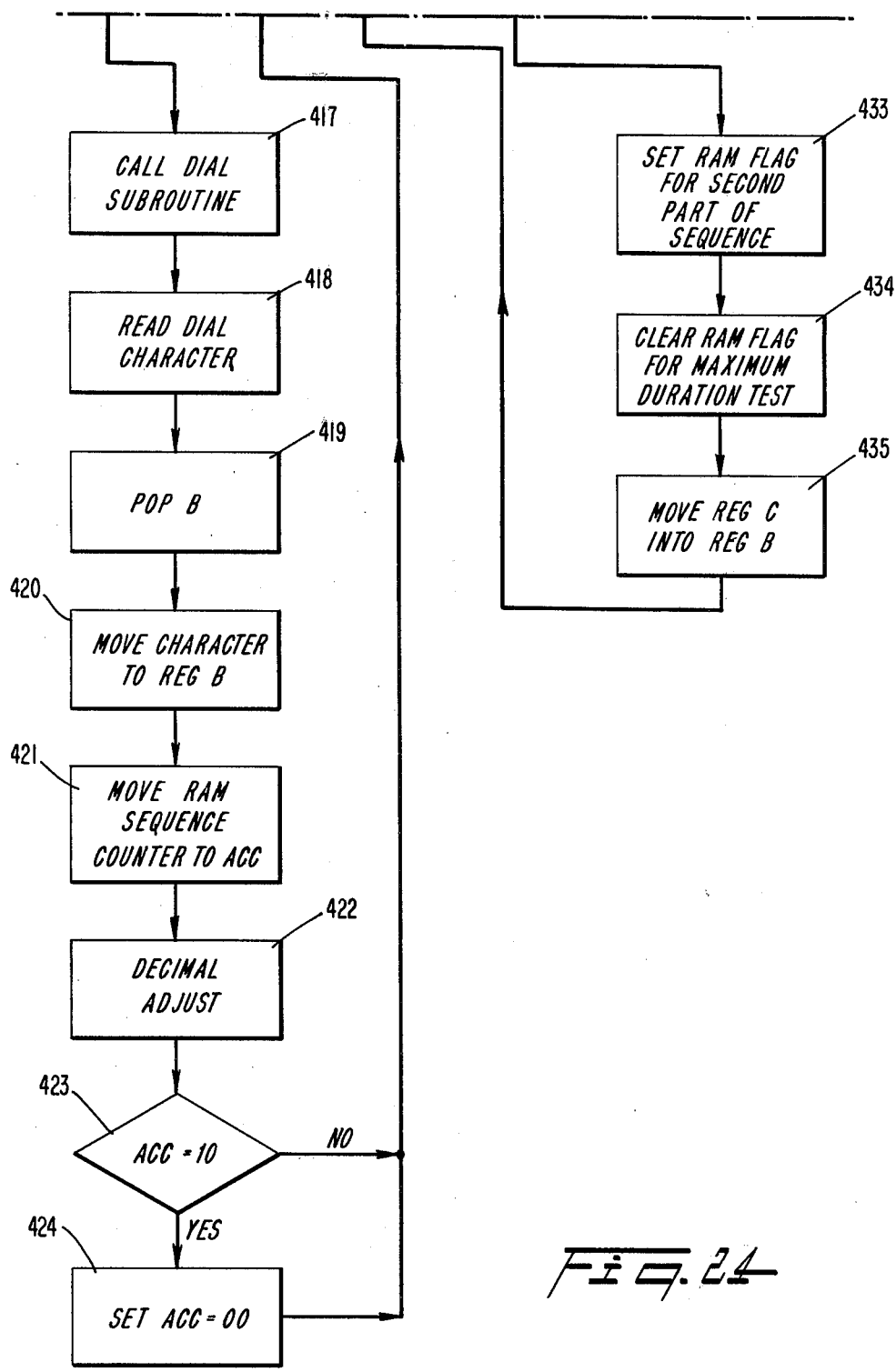

Referring to FIGS. 23 and 24, the flow chart illustrated therein reveals the steps of a DIAL SEQUENCE subroutine which verifies the order of the characters in the predetermined sequence. As noted above, the predetermined sequence contains the following order of characters: 1 through 9, 0, *, # and 1 through 4 for a total of sixteen characters. The subroutine divides the sequence into two parts and verifies each separately. The first part of the sequence contains twelve characters 1 through 9, 0, * and # and the second part contains four characters 1 through 4. Step 411 delays execution of the subroutine until the cycle switch 105 has been released and deactivated by the operator. Step 412 sets the RAM flag for maximum duration test. Step 413 sets a second RAM flag which indicates the first part of the sequence is being verified. Step 414 sets the contents of register B equal to a hexidecimal value of OD and the contents of register C equal to a hexidecimal value of 05. The hexidecimal value OD stored in register B is equivalent to a decimal value of thirteen. Step 415 initializes a dialing sequence counter (not shown), which is part of the RAM circuit 64 (FIG. 5), to a hexidecimal value of 01. Step 416 stores the contents of register B.

Step 417 calls the DIAL TEST subroutine which determines the character represented by the multifrequency signal as described above. Step 418 stores in the accumulator the character which was determined by the DIAL TEST subroutine. Step 419 restores the contents of register B to the hexidecimal value of OD while step 420 stores the character in register D. Step 421 moves the contents of the dialing sequence counter into the accumulator. Step 422 facilitates the conversion of the value stored in the accumulator, which is in hexidecimal form, to its decimal equivalent. Step 423 determines if the value stored in the accumulator is equal to a decimal value of ten. Step 424 facilitates the display of zero (00) if the value stored in accumulator is equal to the value ten. Otherwise, step 425 compares the contents of the accumulator with the contents of register D.

Step 426 calls the CYCLE subroutine and waits for the cycle switch 105 to be activated if the comparison in step 425 is negative. Step 427 moves the contents of the dialing sequence counter into the accumulator. Step 428 increments the contents of the accumulator by a value of one. Step 429 stores the contents of the accumulator in the RAM sequence counter. Step 430 compares the contents of the accumulator with the contents of register B. Execution of the subroutine is then transferred to step 416 if the contents of the accumulator is not equal to thirteen. Steps 416 through 430 are repeated until (1) the contents of the accumulator do not compare with the contents of register D, which indicates an improper order, or (2) the contents of the accumulator has a value of thirteen, which indicates that the order of the first part of the sequence is proper.

Figure 7:
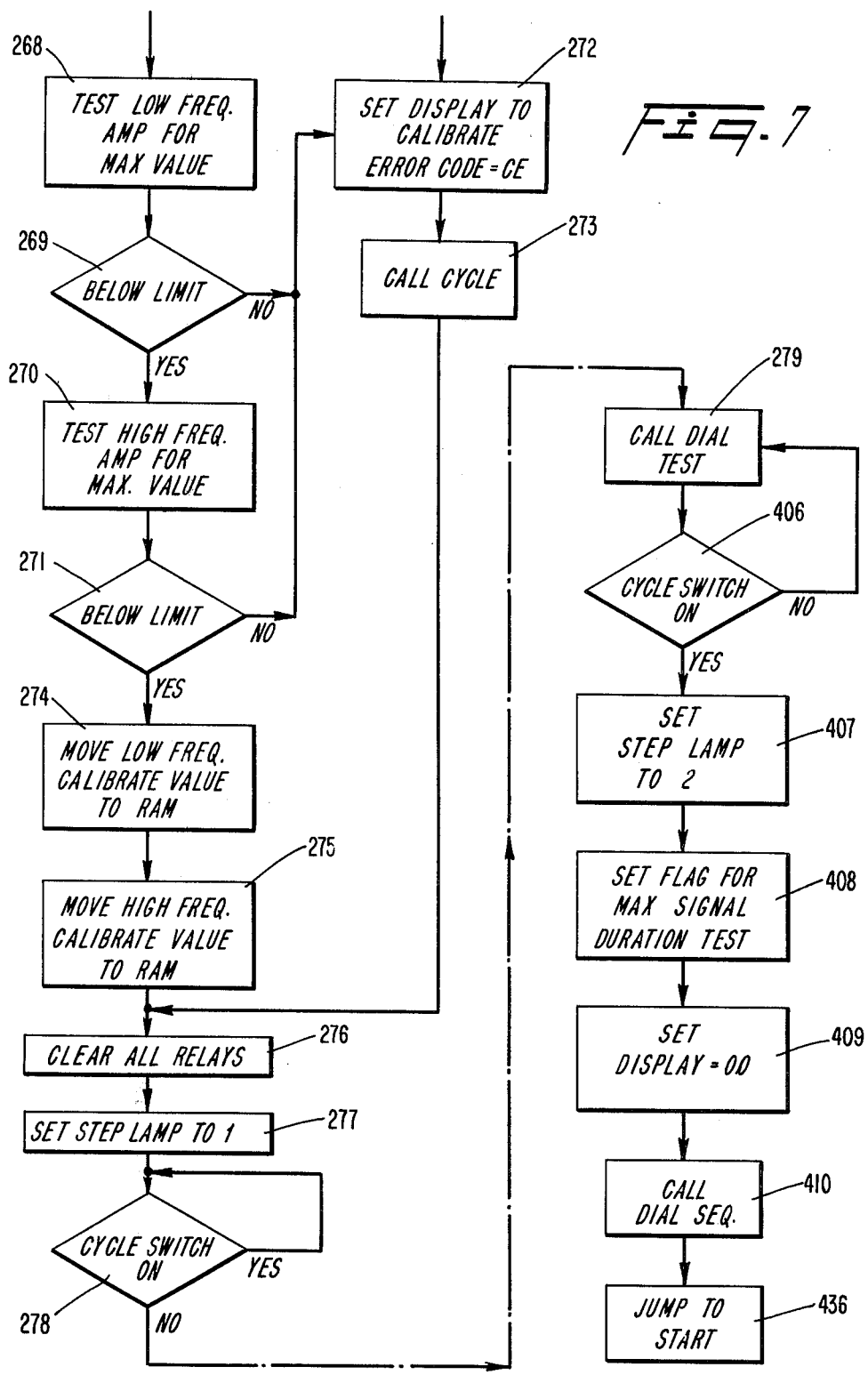

Once the order of the first part of the sequence has been verified as proper, the subroutine then checks the second part. Step 431 moves the sequence RAM flag into the accumulator. Step 432 determines if the contents of the accumulator indicates the beginning of the last part of the sequence. Step 434 clears the RAM flag for the maximum duration test. Step 435 moves the contents of register C into register B and then transfers execution of the subroutine to step 415. Thereafter, steps 416 through 430 are repeated until (1) an improper order is detected or (2) the accumulator has a value of five, which indicates the proper order of characters in the predetermined sequence. Thereafter, steps 431 and 432 are repeated, however, execution will terminate in step 432 because the sequence is completed. Execution is thereafter transferred to step 436 (FIG. 7).

What is claimed is:

1. A method of testing the frequency of a signal, which comprises the steps of:
    (a) feeding a standard signal having a known amplitude through a signal preparation circuit to determine any gain or loss in amplitude as the signal is being fed through the signal preparation circuit;
    (b) processing an unprocessed signal through the signal preparation circuit wherein the unprocessed signal is being prepared to test the frequency thereof;
    (c) adjusting the amplitude of the processed signal by an amount equal to the determined gain or loss of the amplitude of the standard signal;
    (d) determining whether the adjusted amplitude of the processed signal exceeds a predetermined threshold amplitude value;
    (e) measuring, from a precise time of the unprocessed signal, the time interval required by a preset number of cycles of the unprocessed signal, in response to the determination that the adjusted amplitude of the processed signal exceeded the predetermined threshold amplitude value, to provide an indication of the frequency of the unprocessed signal; and
    (f) comparing the measured time interval with a preset time interval to provide an indication as to whether the frequency of the unprocessed signal is an acceptable frequency.

2. A method of testing the frequency of a signal, which comprises the steps of:
    (a) feeding a standard signal having a known amplitude through a signal preparation circuit;

(b) determining the amplitude of the standard signal after the signal has been fed through the signal preparation circuit;
(c) generating a calibration factor which is the difference between the known amplitude and the determined amplitude of the standard signal wherein the calibration factor represents a gain or loss in amplitude of the standard signal as the signal is being fed through the signal preparation circuit;
(d) processing an unprocessed signal through the signal preparation circuit wherein the unprocessed signal is being prepared to test the frequency thereof;
(e) adjusting the amplitude of the processed signal by an amount equal to the generated calibration factor to compensate for gain or loss in amplitude as the unprocessed signal is being processed through the signal preparation circuit;
(f) determining whether the adjusted amplitude of the processed signal exceeds a predetermined threshold value;
(g) measuring the time interval required by a preset number of cycles of the unprocessed signal, in response to the determination that the adjusted amplitude of the processed signal exceeds the predetermined threshold amplitude value, to provide an indication of the frequency of the unprocessed signal; and
(h) comparing the measured time interval with a preset time interval to provide an indication as to whether the frequency of the unprocessed signal is an acceptable frequency.

* * * * *